United States Patent
Gallagher et al.

(10) Patent No.: US 11,314,793 B2
(45) Date of Patent: Apr. 26, 2022

(54) QUERY PROCESSING

(71) Applicant: Soleo Communications, Inc., Victor, NY (US)

(72) Inventors: Daniel E. Gallagher, Fairport, NY (US); Jason T. Nordhaus, Rochester, NY (US); William Consagra-Francis, Brockport, NY (US); Scott M. Leubner, Pittsford, NY (US); Richard W. Ibbotson, Fairport, NY (US)

(73) Assignee: Soleo Communications, Inc., Rochester, NY (US)

( * ) Notice: Subject to any disclaimer, the term of this patent is extended or adjusted under 35 U.S.C. 154(b) by 835 days.

(21) Appl. No.: 15/941,527

(22) Filed: Mar. 30, 2018

(65) Prior Publication Data

US 2018/0293299 A1    Oct. 11, 2018

Related U.S. Application Data

(60) Provisional application No. 62/483,083, filed on Apr. 7, 2017.

(51) Int. Cl.
*G06F 16/00* (2019.01)
*G06F 16/332* (2019.01)
*G06F 3/16* (2006.01)
*G06F 16/338* (2019.01)
*G06F 16/9535* (2019.01)

(52) U.S. Cl.
CPC .......... *G06F 16/3325* (2019.01); *G06F 3/167* (2013.01); *G06F 16/338* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 8,346,791 B1 * | 1/2013 | Shukla | G06F 16/248 707/759 |
| 2004/0054691 A1 * | 3/2004 | Sharma | G06F 16/24575 |
| 2007/0006098 A1 * | 1/2007 | Krumm | H04W 4/18 715/825 |
| 2009/0119250 A1 * | 5/2009 | Reed | H04M 3/4931 |

* cited by examiner

*Primary Examiner* — Thu Nguyet T Le
(74) *Attorney, Agent, or Firm* — Lee & Hayes, P.C.

(57) ABSTRACT

A method includes associating an identifier with a plurality of business listings, receiving a first query, generating a second query based at least in part on the first query, the second query including at least one word included in the first query, and selecting a subset of business listings based at least in part on the second query. The method also includes providing the subset of business listings such that the subset of business listings is configured to be displayed in a ranked order. In such methods, the ranked order is based at least in part on respective levels of relatedness between the second query and listings included in the subset of business listings.

23 Claims, 12 Drawing Sheets

QUERY PROCESSING

CROSS-REFERENCE TO RELATED APPLICATIONS

This application is a nonprovisional of and claims the benefit of U.S. Provisional Patent Application No. 62/483,083, filed Apr. 7, 2017, the entire disclosure of which is incorporated herein by reference.

BACKGROUND

Mobile phones, computers, tablets, and other electronic devices can be used in a variety of applications. For example, such devices may be employed by users to find information related to various queries or other like requests. In some instances, a user may enter a query into an application (e.g., an internet-based search engine or other like search application) active on an electronic device, and in response, the application may generate a query response that includes a list of results that are related to the query.

However, such applications are typically not configured to determine the intent of the user based on contextual information associated with the query and/or based on a natural language-based analysis of the query. For example, in situations in which the user enters a relatively broad and/or relatively vague query, the search engine may provide the user with search results that are tangentially related to the query, but that do not surface the information that the user is actually looking for. Such results can cause frustration, and may require the user to re-enter the query in a different form, thereby increasing the time required for the user to obtain the information initially being sought.

Example embodiments of the present disclosure are directed toward curing one or more of the deficiencies described above.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
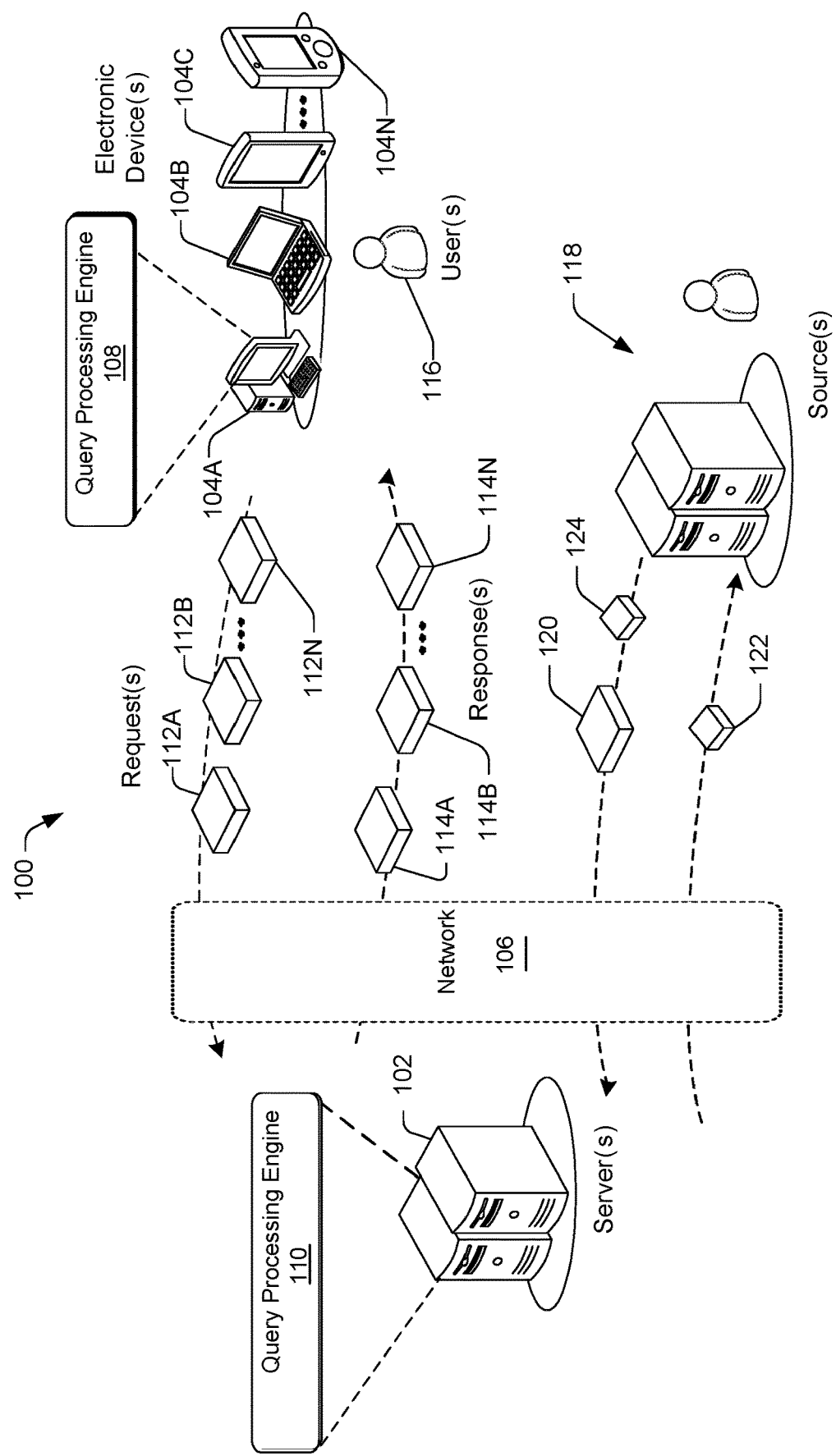
FIG. 1 is a schematic diagram of an illustrative environment for implementing various query processing tasks.

The present disclosure is directed to devices and techniques for identifying the intent of a user based on a natural language query provided by the user in combination with user device location, time of day, and/or other contextual information related to the entered query. The various methods described herein may also include generating and updating a unique business listing taxonomy based on business listing information received from a variety of different sources. As part of this process, such information may be stored in association with one or more identifiers serving to categorize the information. Such identifiers may be useful in retrieving relevant business listings in response to a query. Additionally, the information associated with each received business listing, and/or the one or more identifiers assigned to the respective business listings, may be updated over time.

For example, in an embodiment of the present disclosure, a method may include, among other things, receiving, with a server, a plurality of business listings, each listing of the plurality of business listings including information identifying a respective business entity. The method may also include associating, within a memory associated with the server, an identifier with each listing of the plurality of business listings, each respective identifier being indicative of information included in listings of the plurality of listings associated with the respective identifier. Such a method may also include receiving, with the server and via a network, a first query, the first query including a word. The method may also include generating, with the server, a second query based at least in part on the first query and on a query rule set stored within the memory, the second query including at least one word included in the first query. Such a method may further include comparing the second query with at least a first subset of business listings included in the plurality of business listings, selecting, based at least in part on the comparing, a second subset of business listings included in the at least the first subset of business listings, and providing the second subset of business listings configured to be displayed in a ranked order. In such examples, the ranked order may be based at least in part on respective levels of relatedness between the second query and each listing included in the second subset of business listings.

It is understood that any of the methods described herein may include, among other things, identifying a pattern associated with pages of a website, identifying the pages of the website as including product information or service information based at least in part on the pattern, and forming at least one business listing using the product information or the service information. In such methods, an example pattern may be based on at least one of page density, page weight, or page format. Further, any of the example methods described herein may include identifying a pattern associated with text included in a page of a website, the pattern indicating contact information associated with a first business entity corresponding to the website. Such an example method may also include adding the contact information to a business listing associated with the first business entity.

In another example embodiment of the present disclosure, a system may include, among other things, a server, and memory associated with the server. The memory may store a plurality of business listings and instructions which, when executed by the server, cause the server to perform operations including associating, within the memory, an identifier with the plurality of business listings, the identifier being indicative of information included in the plurality of business listings. Such operations may also include receiving, via a network, a first query, the first query including a word. Such operations further also include generating a second query based at least in part on the first query and on a query rule set stored within the memory, the second query including at least one word included in the first query, and selecting a subset of business listings included in the plurality of business listings, wherein the subset of business listings is selected based at least in part on the second query. Such operations may also include providing the subset of business listings via the network such that the subset of business listings is configured to be displayed in a ranked order. In such examples, the ranked order may be based at least in part on respective levels of relatedness between the second query and each listing included in the subset of business listings.

In still another example embodiment of the present disclosure, a system may include, among other things, a server in communication with a network, and a memory associated with the server. In such systems, the memory may store a plurality of business listings and instructions which, when executed by the server, cause the server to perform operations including associating, within the memory, at least one identifier with each listing of the plurality of business listings, and receiving, via the network and from an electronic device remote from the server, a first query associated with the plurality of business listings. Such operations may also include receiving, via the network and from the electronic device, contextual information associated with at least one of the electronic device and the first query, and generating a second query based at least in part on the first query and on a query rule set stored within the memory, the second query including at least one word included in the first query. Such operations may further include selecting a subset of business listings included in the plurality of business listings, wherein the subset of business listings is selected based at least in part on the second query and the contextual information. In addition, such operations may include providing the subset of business listings via the network such that the subset of business listings is configured to be displayed on the electronic device in a ranked order. In such examples, the ranked order may be based at least in part on respective levels of relatedness between the second query and each listing included in the subset of business listings.

The methods described herein may leverage the business listing taxonomy described above in order to provide search results that are more closely tied to the intent of the user than typical search engines. As a result, the techniques described herein will improve user satisfaction. Additionally, the techniques described herein involve reducing the size and complexity of the search string (e.g., text entered by the user in a natural language query) utilized to identify search results.

Reducing the size and complexity of the search string in this way reduces the processor, memory, and/or other computing device resources required to generate search results, thereby improving network, server, and/or electronic device performance and efficiency.

Illustrative environments, devices, and techniques for query processing are described below. However, the described query processing techniques may be implemented in other environments and by other devices or techniques, and this disclosure should not interpreted as being limited to the example environments, devices, and techniques described herein.

Illustrative Architecture

FIG. 1 is a schematic diagram of an illustrative computing environment 100 for implementing various taxonomy generation and/or query processing techniques. The computing environment 100 may include server(s) 102 and one or more electronic devices 104(1)-104(N) (collectively, "electronic devices 104") that are communicatively connected by a network 106. The network 106 may be a local area network ("LAN"), a larger network such as a wide area network ("WAN"), or a collection of networks, such as the Internet. Protocols for network communication, such as TCP/IP, may be used to implement the network 106. Although embodiments are described herein as using a network 106 such as the Internet, other distribution techniques may be implemented that transmit information via memory cards, flash memory, or other portable memory devices.

A query processing engine 108 on the electronic devices 104 and/or a query processing engine 110 on the server(s) 102 may receive one or more digital requests 112(1)-112(N) (collectively, "requests 112," "digital queries 112," or "queries 112") and may generate one or more digital responses 114 (or "responses 114") based on the queries 112. In example embodiments, the query processing engine 108 of an electronic device 104 may receive one or more queries 112 via interaction of a user 116 with the electronic device 104. In such embodiments, the query processing engine 108 may provide such queries 112 to the query processing engine 110 of the server 102, via the network 106, to generate at least a portion of the response 114. Alternatively, at least a portion of the response 114 may be generated by the query processing engine 108 of the respective electronic device 104.

The example environment 100 may also include one or more information sources 118 separate from the servers 102 and the electronic devices 104. Such sources 118 may include one or more additional electronic devices (e.g., a server, and/or any of the devices or components described herein with respect to the electronic devices 104), human users, information databases, websites, business research companies, and/or any other information source. Any of the example sources 118 described herein may be communicatively connected to the servers 102 via the network 106, and such sources 118 may be disposed at a location remote from the electronic devices 104 and/or from the servers 102. In example embodiments, a server 102 may receive one or more business listings 120 from the sources 118, and each such business listing 120 may include information identifying and/or otherwise associated with a respective business entity (e.g., a restaurant, a supermarket, a department store, etc.). As will be described in greater detail below, in some examples a business listing 120 received by the server 102 may be incomplete, inaccurate, and/or may lack certain information associated with the business entity with which the business listing 120 corresponds. In such examples, the server 102 may be configured to send, transmit, and/or otherwise provide one or more requests 122 to one or more of the sources 118. Such requests 122 may comprise digital messages, signals, packets, or other electronic correspondence requesting additional information regarding the respective business entity. At least partly in response to such requests 122, the server 102 may receive one or more responses 124 from various sources 118. Similar to the requests 122 described herein, such responses 124 may comprise digital messages, signals, packets, or other electronic correspondence including the requested information, and the server 102 may augment, update, delete, and/or otherwise modify the respective business listing 120 based at least in part on the information in the responses 124.

Each of the electronic devices 104 may include, among other things, a display component, a digital camera, and an audio input and transmission component. Such display components may comprise a touch screen or other like component configured to display text, images, video, and/or other content associated with the various queries 112 and responses 114 described herein. Such display components may also be configured to display a keyboard, buttons, slider bars, and/or other like controls configured to receive input from the user 116. Additionally or alternatively, the electronic devices 104 may include an external keyboard or other such input/output ("I/O") device configured to receive input from the user 116. Additionally, such audio input and transmission components may include one or more microphones. In such examples, the electronic devices 104 may receive inputs (e.g., audible instructions, voice commands, etc.) from the user 116 via a microphone, and the electronic devices 104 may be equipped with, for example, voice recognition software configured to process such inputs. Further, the digital cameras of the electronic devices 104 may be configured to track, record, and/or otherwise receive gesture inputs from the user 116. In some embodiments, the digital cameras of the electronic devices 104 may receive such gesture inputs without contact being made between the user 116 and, for example, the display or other components, controls, or surfaces of the electronic devices 104. In such examples, the electronic devices 104 may be equipped with, for example, gesture recognition software configured to process such inputs.

The electronic devices 104 may also include hardware and/or software that support voice over Internet Protocol (VoIP) as well as any of the display and/or I/O components described herein. Each of the electronic devices 104 may further include a web browser that enables the user 116 to navigate to a web page via the network 106. Each of the electronic devices 104 may also include and/or be configured to operate one or more web-based applications ("apps") with or without connectivity to the network 106. In some embodiments, the user 116 may generate one or more digital queries 112 using such a web page and/or such an app. For example, the user 116 may access and/or otherwise activate an app on the electronic device 104, and may utilize various functionality of the app, in concert with a keyboard displayed on a display of the electronic device 104, the camera, the microphone, and/or a combination thereof, to generate one or more digital queries 112. The app may then facilitate a transfer of the query 112 to the server 102 via the network 106.

Any of the queries 112 described herein may be generated by and/or provided to the query processing engine 108 of the electronic device 104, and the query processing engine 108 may provide such queries 112 to the query processing engine 110 of the server 102. Further, in any of the examples described herein, the query processing engine 108 may augment such queries 112 by tagging, associating, saving, and/or otherwise linking the respective queries 112 with associated metadata. The associated metadata may include contextual information associated with and/or otherwise indicative of the one or more components of the electronic device 104 used to generate the query 112 (e.g., camera, microphone, keyboard, display, etc.), a day, date, time of day, and/or time zone at/in which the query was generated, a geographic location of the electronic device 104 when the query was generated (e.g., latitude and longitude, city, state, zip code, address, global positioning system coordinates, etc.) an identification code unique to the electronic device 104 used to generate the query, an identification code unique to the respective query, and/or other information. Any such contextual information associated with a respective query 112 may be interpreted and/or otherwise processed, along with the query 112, by the query processing engine 110 of the server 102. Various example components and functionality of the query processing engines 108, 110 will be described in greater detail below with respect to, for example, FIGS. 2 and 3.

In various embodiments, the electronic devices 104 may include a mobile phone a portable computer, a tablet computer, an electronic book reader device (an "eBook reader device"), or other devices. Each of the electronic devices 104 may have software and hardware components that enable the input and display of digital queries 112, as well as the display of various digital responses 114 described herein. The electronic devices 104 noted above are merely examples, and other electronic devices that are equipped with network communication components, data processing components, electronic displays for displaying data, and components configured to receive multiple user inputs may also be employed.

Example Server

Figure 2:
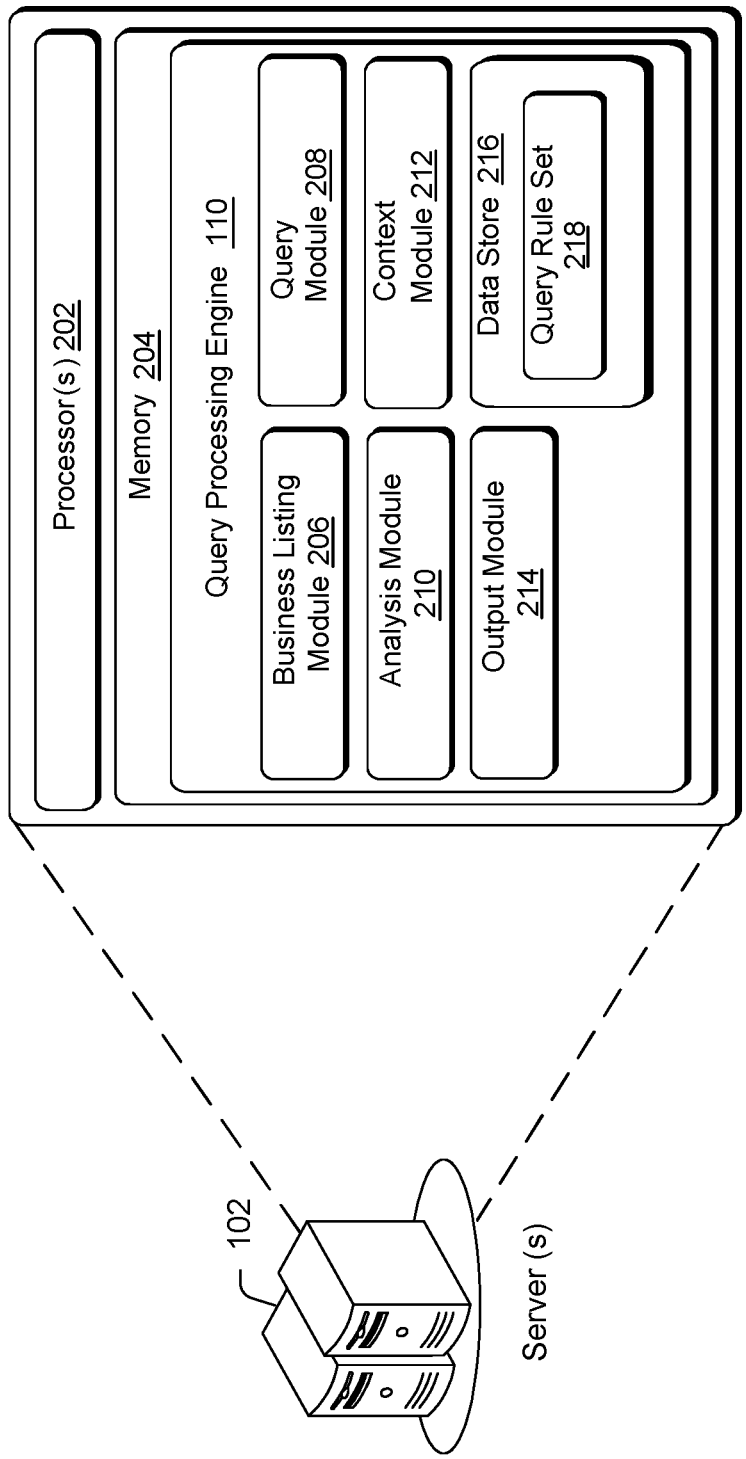
FIG. 2 is a schematic diagram of illustrative components in an example server that may be used in an example query processing environment.

FIG. 2 is a schematic diagram illustrating components of an example server 102 of the present disclosure. The server (s) 102 may comprise server computers, rack systems, and/or other computing devices, and such servers 102 may include one or more processor(s) 202 and memory 204. The memory 204 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as carrier waves, or other transmission mechanisms.

The query processing engine 110 may be a hardware or a software component of the server(s) 102 and in some embodiments, the query processing engine 110 may comprise a component of the memory 204. As shown in FIG. 2, in some embodiments the query processing engine 110 may include one or more of a business listing module 206, a query module 208, an analysis module 210, a context module 212, and an output module 214. The modules of the query processing engine 110 may include routines, programs instructions, objects, and/or data structures that perform particular tasks or implement particular abstract data types. The server(s) 102 may also implement a data store 216 that stores data, digital queries 112, and/or other information or content used by the query processing engine 110. For example, the data store 216 may store a query rule set 218 that may be used by the query processing engine 110 to generate one or more modified queries based on a query 112 received from an electronic device 104.

The business listing module 206 may be configured to receive a plurality of business listings 120 from the sources 118 described above. Upon receiving such business listings 120, business listing module 206 may be configured to associate a unique category and/or other identifier with each respective business listing 120. For example, the business listing module 206 may be configured to generate one or more such identifiers, and to link such identifiers with the various business listings 120 based on information that is included in the received business listings 120. For example, as noted above, each business listing 120 may include information identifying and/or otherwise indicative of a business entity corresponding to the respective business listing 120. As will be described in greater detail below, such information may include, among other things, text, images, audio, video, and/or other content describing at least one of goods and services provided by the particular business entity corresponding to the business listing 120. Such information may also include, for example, the name, address, telephone number, and/or website of the business entity, and/or other information helpful in identifying the entity. In such examples, the business listing module 206 may generate one or more unique identifiers based on and/or otherwise corresponding to such information. For example, in generating such a unique identifier, the business listing module 206 may compare the information included in the business listing 120 with other information included in one or more previously received and/or stored business listings 120. Through such a comparison, the business listing module 206 may find two or more similar business listings 120, and may associate a common identifier with such business listings 120. For example, the business listing module 206 may identify two or more business listings 120 containing information indicating that the entities associated with the business listings 120 each comprise restaurants specializing in a particular type of food (e.g., Mexican food, Italian food, French food, etc.). In such an example, the business listing module 206 may associate one or more common identifiers with each of the two or more business listings 120 based upon the shared characteristics of such information. For example, business listing module 206 may link, assign, save, and/or otherwise associate such similar business listings 206 with an identifier (e.g., "restaurant") indicating the type of business entity corresponding to the business listings 120. The business listing module 206 may also link, assign, save, and/or otherwise associate such business listings 120 with an identifier (e.g., Mexican food), indicating the type of goods or services provided by the business entity corresponding to the business listings 120. In such examples, the identifiers described herein may comprise metadata that is linked, assigned, saved, and/or otherwise associated with a business listing 120 by the business listing module 206. In this way, the business listing module 206 may assist in building a unique category/identifier-based taxonomy incorporating each of the business listings 120 received from the various sources 118. Such a taxonomy may be stored within the data store 216, and/or within other portions of the memory 204.

In some examples, building, compiling, defining, and/or otherwise generating one or more of the taxonomies described herein may include utilizing one or more neural networks, machine learning models/algorithms, text recognition algorithms, data recognition algorithms, pattern recognition algorithms and/or other hardware and/or software components to identify various types of information. Example taxonomies of the present disclosure may be generated based at least partly on and/or using such information. For instance, such information may be added to and/or included in such a taxonomy. For example, the business listing module 206 may include and/or may be in communication with one or more pattern recognition engines and/or other hardware or software components (referred to generally herein as "pattern recognition components"). In such examples, the pattern recognition component may be configured to analyze information included in the business listing 120 and/or captured or received from other sources, and to identify address information, telephone numbers, email addresses, website addresses, twitter account information, social media user names, and/or other contact information contained within such information.

In such examples, the pattern recognition component may identify contact information by identifying one or more patterns known to be associated with and/or indicative of such contact information. For instance, the pattern recognition component may be programmed, trained, and/or otherwise configured to identify, in a string of text, one or more capitalized words immediately following a series of numbers as being indicative of a street address (e.g., 3456 Marshall Rd.). Additionally or alternatively, the pattern recognition component may be programmed, trained, and/or otherwise configured to identify particular words (e.g., Road, Avenue, Street, Route, etc.) or abbreviated words (e.g., Rd., Ave., St., Rt., etc.) as being indicative of a street address. In still further examples, the pattern recognition component may be programmed, trained, and/or otherwise configured to identify three numerals separated from four additional numerals by a dash or hyphen as being indicative of a telephone number. Additionally or alternatively, the pattern recognition component may be programmed, trained, and/or otherwise configured to identify three numerals immediately preceded by an open parentheses and immediately followed by a closed parentheses as being indicative of an area code and/or as being associated with a telephone number. While various examples of text patterns have been noted above, in further embodiments, a pattern recognition component of the present disclosure may also be programmed, trained, and/or otherwise configured to identify one or more additional text-based patterns, symbol/character-based patterns, and/or other patterns associated with information included in a business listing 120, included in a website, and/or associated with one or more additional information sources.

In further examples, the pattern recognition component may be configured to analyze information associated with a website, online catalog, online database, and/or other information source to identify one or more additional patterns. For example, in some embodiments the pattern recognition component may be programmed, trained, and/or otherwise configured to identify product information, services information, and/or other information of interest based on a website map, website topography information, and/or other information. In such examples, one or more web crawlers or other like devices may search the internet for websites likely to have information of interest (e.g., information identifying a particular business entity and indicating one or more products and/or services associated with such an entity). Upon identification of such a website, the web crawler and/or the pattern recognition component may obtain a site map associated with the identified website. Such a site map may comprise an organizational hierarchy of pages (e.g., parent pages, child pages, intermediate pages, etc.) associated with the identified website. In such examples, the pattern recognition component may be programmed, trained, and/or otherwise configured to identify product information, service information, and/or other information of interest based at least in part on the hierarchy of pages indicated by the site map and/or other information associated with the individual pages of the website.

For example, the pattern recognition component may identify product information and/or service information included in one or more pages of an identified website by identifying a number (e.g., a density) of child pages linked to a parent page of the website. In such examples, a relatively large number of child pages linked to a particular parent page of the website (e.g., a relatively high-density of child pages linked to the parent page) may indicate with a relatively high degree of confidence that such child pages contain product information and/or service information associated with the entity corresponding to the website. As a result of such analysis, the business listing module 206 may extract information from the identified child pages.

In further examples, the pattern recognition component may identify portions of the website likely to contain relevant product and/or service information based on one or more additional and/or different parameters of the identified website. For instance, the pattern recognition component may identify a document, a pdf file, a zip file, an embedded link, and/or other electronic file associated with one or more of the child pages. In such examples, such a linked electronic file may comprise a parts list, a menu, and/or other information indicative of goods or services offered via the web site. As a result, the child pages associated with such a linked file may be highly likely to contain product information and/or service information, and the business listing module 206 may be programmed, trained, and/or otherwise configured to extract information from such child pages and/or other child pages associated with that portion of the website.

In still further examples, the pattern recognition component may be programmed, trained, and/or otherwise configured to identify child pages of the website having substantially the same size, weight, format and/or configuration. In such examples, such substantially similar child pages may be generated using a standardized product and/or services template. As a result, such substantially similar child pages may be highly likely to contain product information and/or service information, and the business listing module 206 may be programmed, trained, and/or otherwise configured to extract information from such child pages.

Additionally or alternatively, the business listing module 206 may be programmed, trained, and/or otherwise configured to avoid extracting information from a different portion of the website (e.g., from relatively low-density portions of the website). Such low-density portions of the website may be associated with, for example, blog information, biographical information, employee information, and/or other information that is not highly relevant to building the category-based taxonomies described herein. By filtering out and/or avoiding such low-density portions of the website, the quality, relevance, and/or fidelity of the information utilized by the business listing module 206 may be improved.

Additionally, the business listing module 206 may be configured to analyze at least a portion of the information included in each of the business listings 120 received by the query processing engine 110. For example, the business listing module 206 may be configured to identify a deficiency in the information included the various business listings 120 received from the sources 118. In example embodiments, such deficiencies may include, among other things, missing information (e.g., a missing website, a missing telephone number, missing zip code, etc.) and/or inaccurate or outdated information. In some examples, the business listing module 206 may identify such deficiencies by identifying one or more blank data fields included in the business listing 120. Additionally or alternatively, the business listing module 206 may employ one or more text recognition engines, image recognition engines, and/or other hardware or software (e.g., one or more of the pattern recognition components described above) to assist in identifying such deficiencies. The business listing module 206 may also be configured to generate and/or transmit one or more requests 122 in order to satisfy the identified deficiency. For example, as noted above with respect to FIG. 1 such requests 122 may comprise requests for additional information corresponding to one or more business listings 120. Upon receiving various responses 124 from the sources 118, the business listing module 206 may augment the information included in a particular business listing 120 having the identified deficiency by adding at least a portion of the additional information included in one or more of the received responses 124 to the particular business listing 120.

The query module 208 may be configured to receive one or more of the digital requests and/or other queries 112 described herein, and to generate a secondary query that is based at least in part on one or more of the received queries 112. For example, upon receiving a query 112 from an electronic device 104, and via the network 106, the query module 208 may analyze and/or otherwise parse the words, text, images, audio, video, and/or other content included in the received query 112. In such examples, the received query 112 may comprise a relatively vague natural language question, statement, or inquiry, and the query module 208 may generate a secondary query that is based at least in part on the received query 112, and that may include at least one word included in received query 112.

In some examples, the secondary query generated by the query module 208 may be a smaller, more concise version of the received query 112. For example, in generating the secondary query, the query module 208 may reference the query rule set, 218 stored within the data store 216. As will described below, the query rule set, 218 may include one or more lists of words that may be removed from the received query 112 when generating the secondary query without modifying the meaning of the query 112. The query rule set 218 may also include word order commands, syntax commands, grammar commands, and/or various other commands useful in generating a secondary query based on a received natural language-based query 112. It is understood that removing words and/or other content from the received query 112 when generating secondary query may result in the secondary query having a relatively smaller file size than the received query 112. Thus, the generated secondary query may require less memory space for storage than the received query 112, and less processor and/or network resources to process. As a result, the efficiency and operation of the various systems described herein may be improved due to the generation of such secondary queries.

The analysis module 210 may be configured to receive the secondary query from the query module 208, and to compare at least a portion of the secondary query with one or more business listings 120. For example, the various business listings 120 received by the business listing module 206 may be stored in the data store 216, and/or in other portions of the memory 204. Upon receiving a secondary query generated by the query module 208, the analysis module 210 may compare the text, content, and/or other information included in the secondary query with the information included in each of the stored business listings 120. Such a comparison may include determining a plurality of relatedness values. For example, the analysis module 210 may determine a unique relatedness value corresponding to each respective business listing 120 stored within the memory 204, and/or corresponding to each respective business listing 120 of a subset of the business listings 120 stored within the memory 204. In such examples, each relatedness value generated by the analysis module 210 may be indicative of a level of relatedness between the secondary query and the respective business listing 120 to which the relatedness value corresponds. Further, in such examples each relatedness value may comprise a quantifiable metric indicative of how similar the text, content, and/or other information included in the secondary query is to the information included in each of the compared business listings 120. For example, in determining one or more relatedness values, the analysis module 210 may match at least one word included in the secondary query with a corresponding word of one or more of the business listings 120. Such a match may indicate that the secondary query is relatively closely related to the one or more business listings 120 including the matched word. As a result, the analysis module 120 may link, assign, and/or otherwise associate a relatively high relatedness value with each of the matched business listings 120.

Further, the analysis module 210 may be configured to select at least a subset of the business listings 120 based at least in part on the comparison described above. For example, the analysis module 210 may be configured to select a group of the business listings 120 having relatively high relatedness values such that the selected subset of businesses listings 120 may be provided to a user 116 of the electronic device 104.

As noted above, the queries 112 received by the query processing engine 110 may each include varying degrees of contextual information associated therewith. Such contextual information may include, among other things, the one or more components of the electronic device 104 used to generate the query 112 (e.g., camera, microphone, keyboard, display, etc.), a day, date, time of day, and/or time zone at/in which the query 112 was generated, a geographic location of the electronic device 104 when the query 112 was generated (e.g., latitude and longitude, city, state, zip code, address, global positioning system coordinates, etc.) an identification code unique to the electronic device 104 used to generate the query 112, an identification code unique to the respective query 112, and/or other information (e.g., a list of previous searches/queries performed by the user 116 and/or on the electronic device 104). In such examples, the context module 212 may omit and/or cause one or more of the business listings 120 to not be selected by the analysis module 210. For example, the context module 212 may recognize various negation language or other omission conditions included in a query 112, and may withhold one or more of the business listings 120 from being selected and/or displayed based on such language. Such omission conditions may also be included in the query rule set 218, and the context module 212 may cause one or more of the business listings 120 to be withheld, not displayed, and/or omitted based on such conditions.

The output module 214 may facilitate the presentation of a digital response 114 to one or more of the electronic devices 104. For example, once the query processing engine 110 has generated a response 114 to the query 112, the output module 214 may direct the digital response 114 to one or more of the electronic devices 104 via the network 106. For example, in embodiments in which the analysis module 210 selects one or more business listings 120 and/or a subset of the business listings 120 stored in the memory 204, the output module 214 may provide the selected business listings 120 to one or more of the electronic devices 104 such that the provided business listings 120 are configured to be displayed in a ranked order that is based at least in part on respective levels of relatedness between the secondary query generated by the query module 208 and each of the selected business listings 120. In such examples, the selected business listings 120 provided by the output module 214 may comprise one or more responses 114 associated with a corresponding query 112. Additionally or alternatively, the output module 214 may be configured to direct one or more digital queries or other requests 122 for information from the server 102 to the sources 118. In any of the embodiments described herein, the output module 214 may comprise one or more kernels, drivers, or other like components configured to provide communication between the servers 102 and one or more of the electronic devices 104 or sources 118.

The data store 216 may store any of the business listings 120, queries 112, secondary queries, responses 114, context information, metadata, content, information, or other data associated with the queries 112, responses 114, requests 122, responses 124, business listings 120, and/or other digital items described herein. For example, the data store 216 may store any of the text, information, metadata, images, video files, audio files, web links, media, or other content that is received from the electronic devices 104 and/or from the sources 118. Such content may be, for example, provided to the data store 216 via the network 106 during creation of the business listing taxonomy described herein and/or as part of any of the query processing methods described herein.

In example embodiments, one or more modules of the query processing engine 110 described above may be combined or omitted. Additionally, one or more modules of the query processing engine 110 may also be included in the query processing engine 108 of the electronic device 104. As a result, the example methods and techniques of the present disclosure, such as methods of generating a business listing taxonomy, methods of generating a query 112, methods of generating a request 122 for additional information, and/or methods of generating/providing a response 114 may be performed solely on either the server 102 or on one of the electronic devices 104. Alternatively, in further embodiments, methods and techniques of the present disclosure may be performed, at least in part, on both the server 102 and on one of the electronic devices 104.

Example Electronic Device

Figure 3:
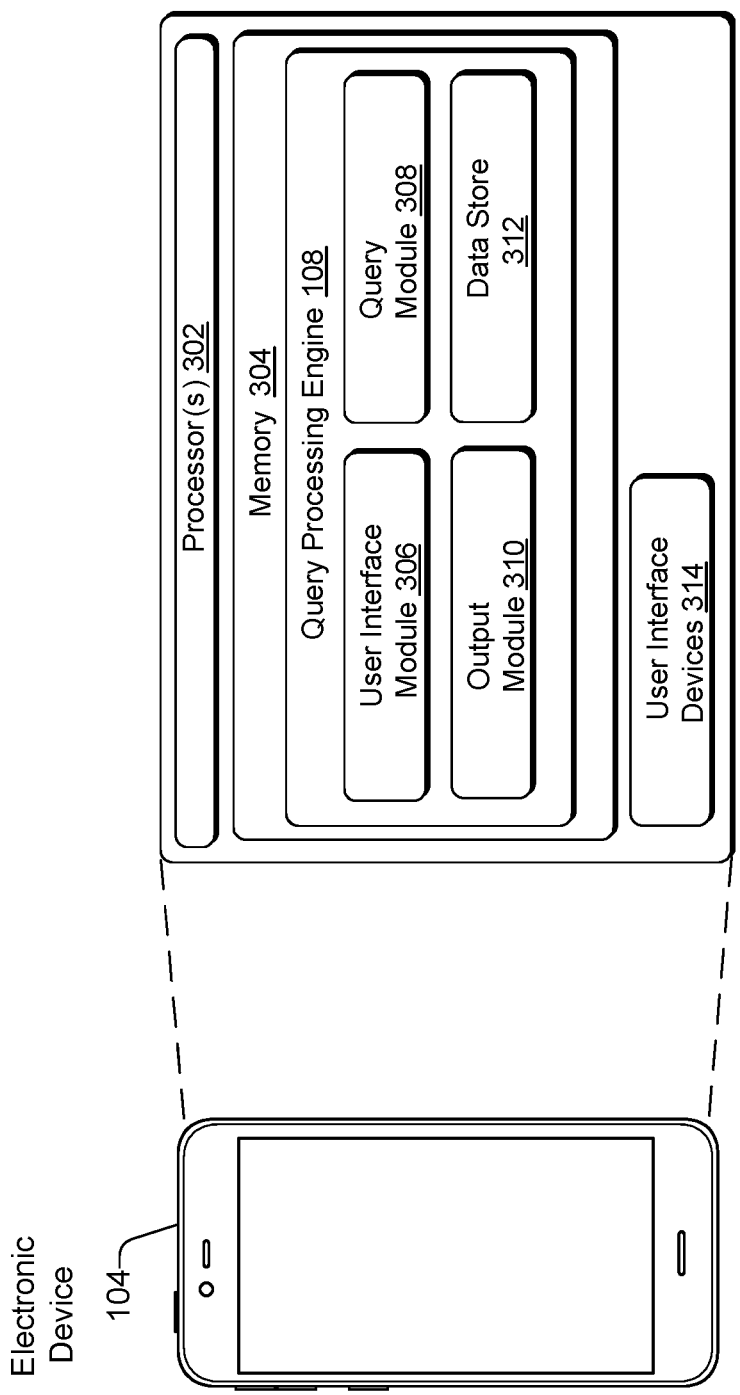
FIG. 3 is a schematic diagram of illustrative components in an example electronic device that may be used in an example query processing environment.

FIG. 3 is a schematic diagram illustrating various components in an example electronic device 104. As noted above, such an electronic device 104 may be used to generate and transmit one or more digital queries 112, and to receive and consume one or more corresponding digital responses 114. The electronic device 104 shown in FIG. 3 may include one or more of the components described above with respect to the server 102 such that digital queries 112 and/or digital responses 114 may be created and/or consumed solely on the electronic device 104. In example embodiments, the electronic device 104 may include one or more processor(s) 302 and memory 304. The memory 304 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as a carrier wave, or other transmission mechanisms.

Similar to the memory 204 of the server 102, the memory 304 of the electronic device 104 may include a query processing engine 108, and the query processing engine 108 may include any of the modules or other components described above with respect to the query processing engine 110 of the server 102. Additionally or alternatively, the query processing engine 108 of the electronic device 104 may include one or more of a user interface module 306, a query module 308, an output module 310, and a data store 312 similar to the data store 216 described above. The modules of the query processing engine 108 may include routines, programs, instructions, objects, and/or data structures that perform particular tasks or implement particular abstract data types. The electronic device 104 may also include one or more cameras, microphones, displays (e.g., a touch screen display), keyboards, mice, touch pads, proximity sensors, capacitance sensors, or other user interface devices 314.

The user interface module 306 may enable the user 116 to access one or more websites, search engines, and/or query generation/processing apps on the electronic device 104. The user interface module 306 may provide a user interface and corresponding functionality associated with such applications via a display of the electronic device 104. The user interface module 306 may also be in communication with one or more additional modules of the query processing engine 108 to assist in various query processing functions. For example, the user interface module 306 may be configured to receive one or more inputs from the user 116, such as via a touch screen display of the electronic device 104, and may be configured to provide such inputs to the query module 308 so that such inputs may be used to generate one or more queries 112. The user interface module 306 may also present, display, and/or otherwise provide one or more responses 114 received from the server 102 on a display of the electronic device 104.

The query module 308 may enable the user 116 to generate one or more queries 112 based at least in part on inputs received from the user 116. For example, the user interface module 306 may provide one or more user interfaces via a display of the electronic device 104, and such user interfaces may include one or more buttons, controls, keyboards, and/or other fields/components configured to receive inputs (e.g., touch inputs). Such inputs may be used by the query module 308 to generate a corresponding query 112. Some examples, such inputs may include a natural language question and/or other statement indicative of information being sought by the user 116. The query module 308 may generate a corresponding query 112 by combining such statement with any of the contextual information described herein. For example, the query module 308 may combine the text of one or more natural language questions entered by the user 116 with metadata indicative of, among other things, the component of the electronic device 104 used to receive the input from the user 116 (e.g., camera, microphone, keyboard, display, etc.), a day, date, time of day, and/or time zone at/in which the input was received from the user 116, a geographic location of the electronic device 104 when the input was received (e.g., latitude and longitude, city, state, zip code, address, global positioning system coordinates, etc.) an identification code unique to the electronic device 104 receiving the input, an identification code unique to the respective query 112 being generated in response to the input, and/or other information (e.g., a list of previous searches/queries performed by the user 116 and/or on the electronic device 104). In such examples, the query 112 generated by the query module 308 may comprise the text of the question and/or other statement provided by the user 116, in combination with any such contextual information.

The output module 310 may be configured to provide one or more queries 112 generated by the query module 308 to the server 102 via the network 106. For example, similar to the output module 214 of the server 102, the output module 310 of the electronic device 104 may comprise one or more kernels, drivers, or other like components configured to provide communication between the servers 102 and one or more of the electronic devices 104.

Example Methods

Figure 9:
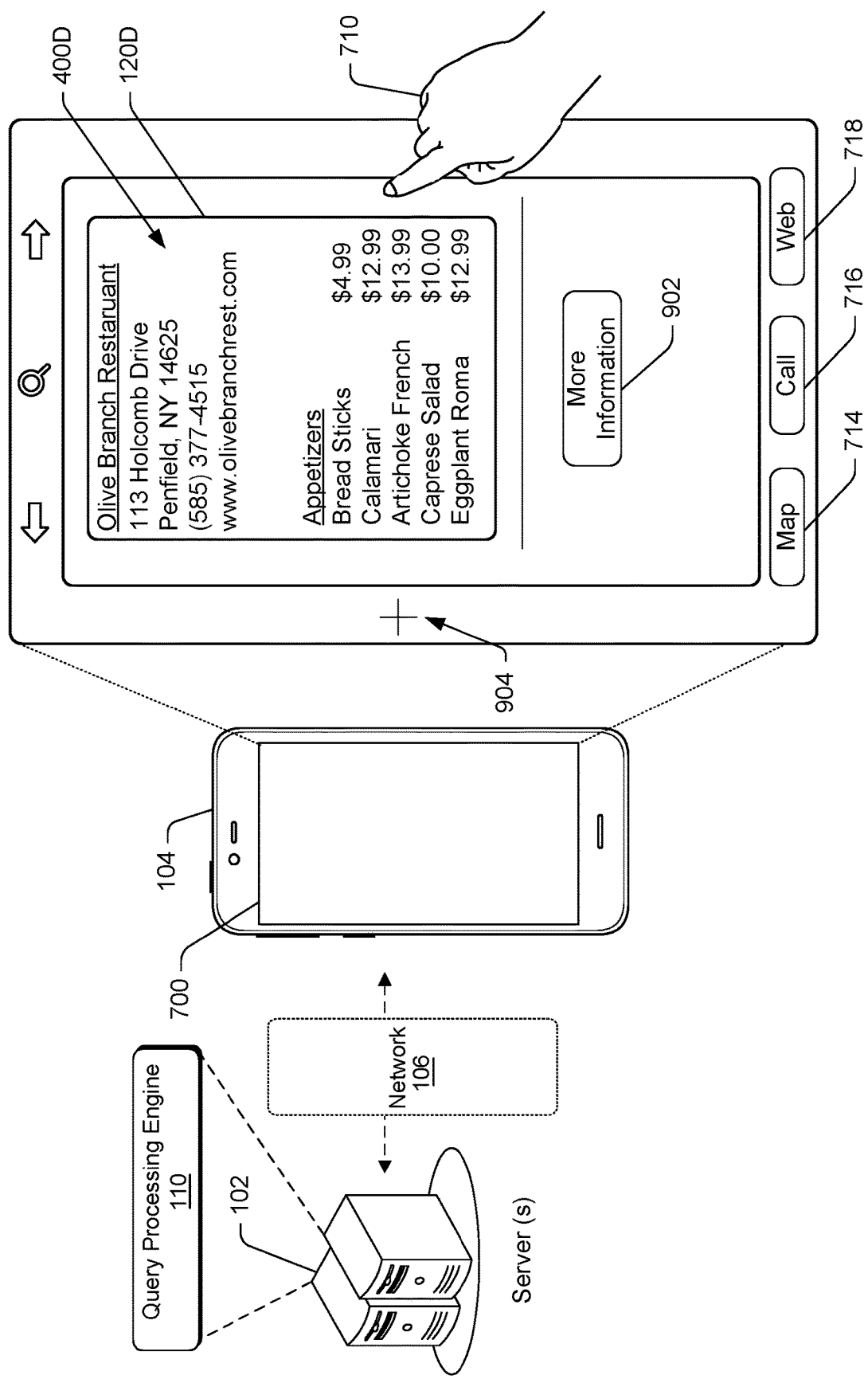
FIG. 9 shows a further example user interface screen displayed on an electronic device that enables users to review one or more selected business listings and/or to provide input.
Figure 10:
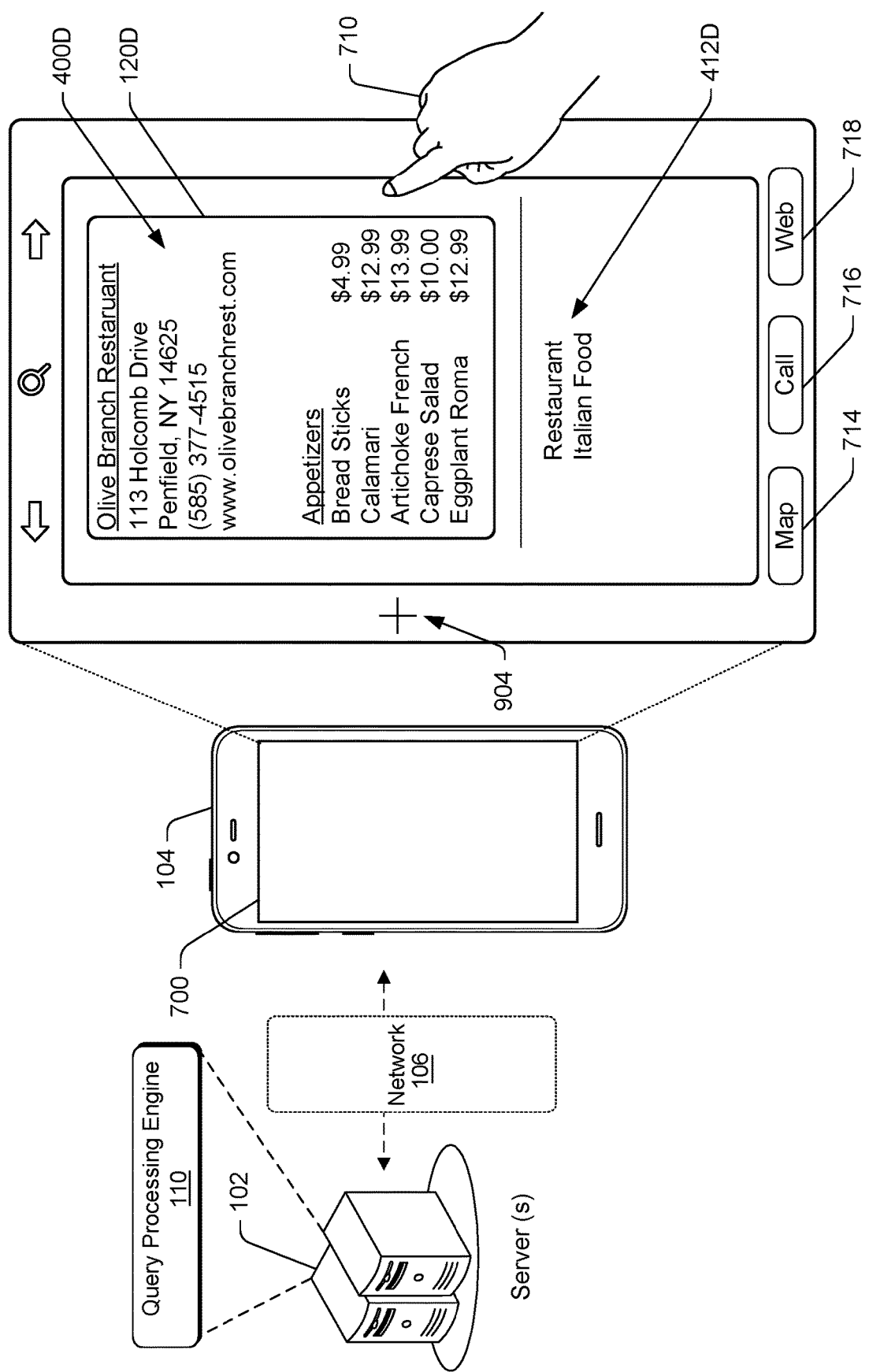
FIG. 10 shows still another example user interface screen displayed on an electronic device that enables users to review one or more selected business listings and/or to review one or more identifiers associated with a selected business listing.
Figure 11:
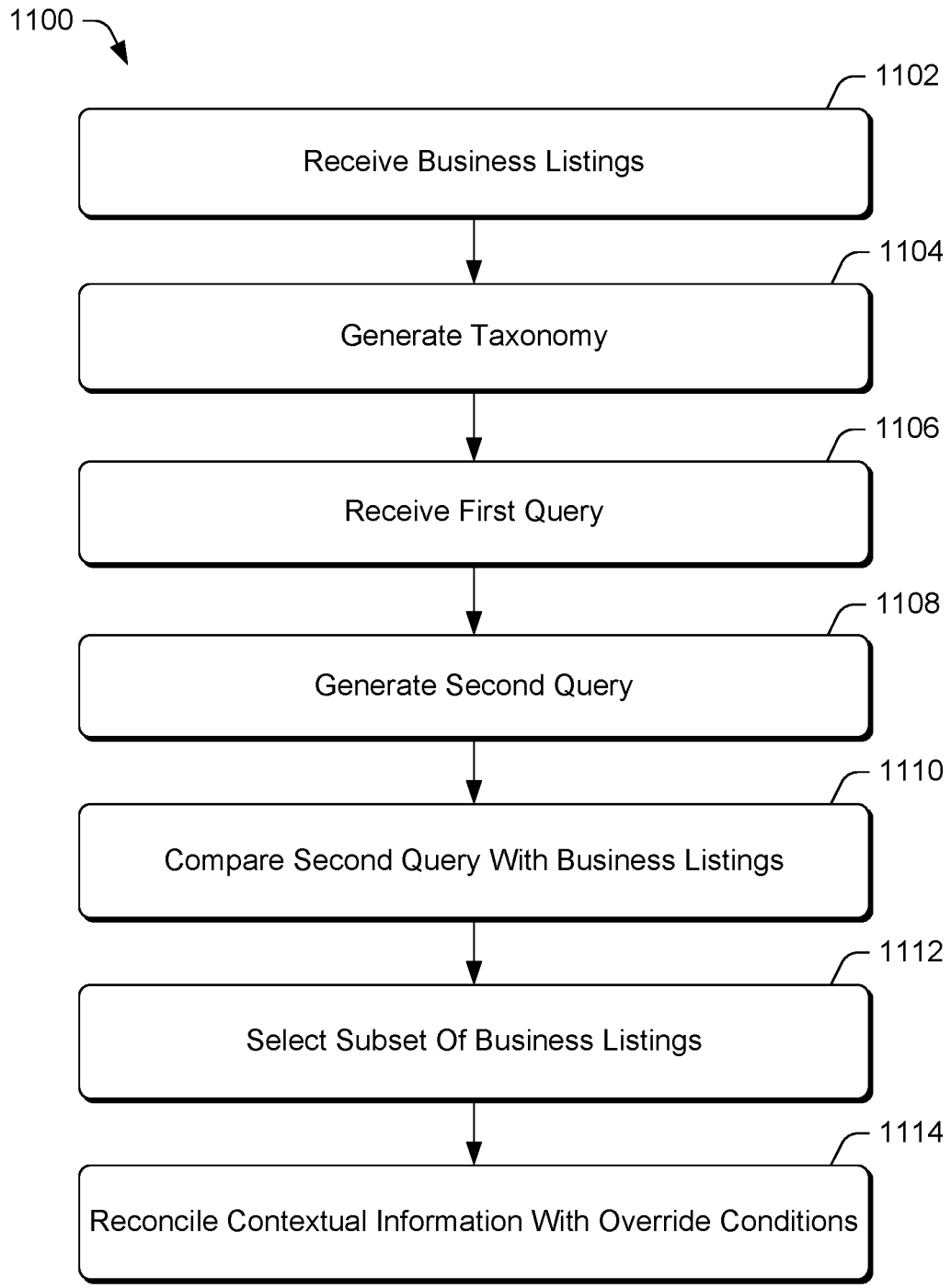
FIG. 11 is a flow diagram of an illustrative query processing method.
Figure 11A:
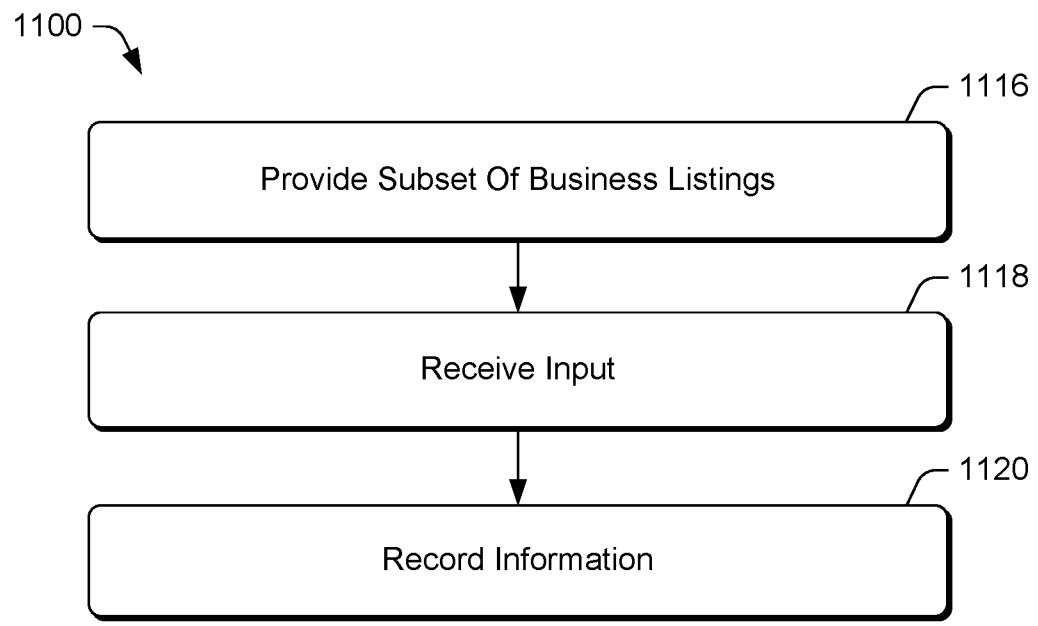
FIG. 11a is a flow diagram illustrating additional steps of the query processing method associated with the flow diagram of FIG. 11.

One or more of the devices described herein with respect to FIGS. 1-3 may comprise a system configured to perform various operations associated with query processing. For example, one or more such devices may be configured to generate, update, and/or modify a robust taxonomy of business listings 120 that includes one or more unique categories or other like identifiers associated with each respective business listing 120 in the taxonomy. One or more such devices may also be configured to access the business listings 120, categories, identifiers, and/or other information included in such a taxonomy to generate a response to the query 112. In any of the examples described herein, a response to the query 112 may include one or more of the categories included in the taxonomy. Additionally or alternatively, such a response may include at least a subset of the business listings 120 included in the taxonomy. In such examples, the subset of business listings 120 may be selected by one or more such devices based at least partly on a determined level of relatedness between a secondary query generated by the one or more such devices and various business listings 120 included in the taxonomy. The flowcharts shown in FIGS. 11 and 11a illustrate an example method 1100 of the present disclosure associated with such techniques. In addition, as will be noted below, FIGS. 4-10 provide further detail related to various aspects of the method 1100.

The example method 1100 is illustrated as a collection of steps in a logical flow diagram, which represents a sequence of operations that can be implemented in hardware, software, or a combination thereof. In the context of software, the steps represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 1100 is described with reference to the environment 100 of FIG. 1, and the corresponding devices illustrated in FIGS. 2 and 3.

Figure 4:
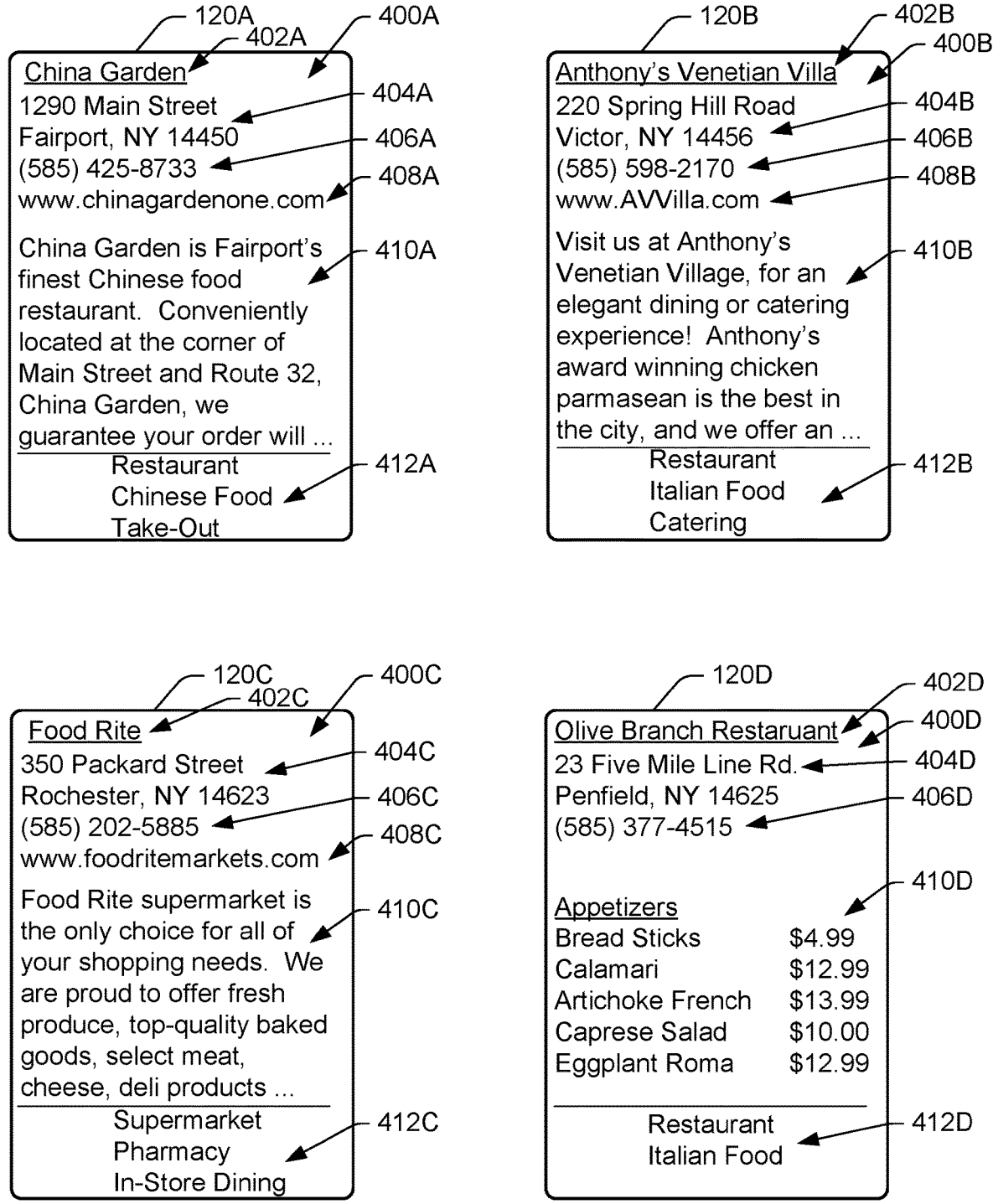
FIG. 4 shows example business listings that may be received and/or modified in an example query processing environment.

With reference to FIG. 11, at block 1102, a server 102 (e.g., a business listing module 206 of the query processing engine 110) may receive a plurality of business listings 120. In such examples, the plurality of business listings may be received by the server 102 via the network 106. FIG. 4 illustrates a plurality of example business listings, 120A, 120B, 120C, 120D of the present disclosure. As shown in FIG. 4, such example business listings 120 may each include information 400A, 400B, 400C, 400D (collectively, "information 400") that is unique to and/or that otherwise identifies a respective business entity associated with the business listing 120. Such information 400 may include, for example, among other things, the name 402A, 402B, 402C, 402D (collectively, "name 402"), address 404A, 404B, 404C, 404D (collectively, "address 404"), telephone number 406A, 406B, 406C, 406D (collectively, "telephone number 406"), and/or website 408A, 408B, 408C, 408D (see FIG. 6) (collectively, "website 408") of the respective business entity. In some examples, such information 400 may also include text 410A, 410B, 410C, 4102D (collectively, "text 410"), images, audio, video, and/or other content that describes and/or that is otherwise associated with at least one of goods and services provided by the particular business entity corresponding to the business listing 120. Upon receiving such business listings 120, the server 102 (e.g., the business listing module 206) may store the respective business listings 120 in the data store 216 and/or in one or more additional portions of the memory 204.

At block 1104 shown in FIG. 11, the server 102 may generate a unique taxonomy and/or other categorization/database infrastructure using the received business listings 120 such that queries 112 received by the server 102 may be responded to efficiently. At block 1104, the server 102 (e.g., the business listing module 206) may generate at least part of the taxonomy using the information 400 received at block 1102. Additionally or alternatively, at block 1104 the server 102 (e.g., the business listing module 206, a pattern recognition component associated with the business listing module 206, and/or any other software or hardware component of the server 102) may obtain information for use in generating the taxonomy based on any of the pattern recognition processes described herein. For instance, at block 1104 an example pattern recognition component associated with the business listing module 206 may analyze information 400 included in a business listing 120, and/or information captured or received from other sources, to identify address information, telephone numbers, email addresses, website addresses, twitter account information, social media user names, and/or other contact information contained within such information. Additionally or alternatively, at block 1104 the pattern recognition component may identify product information, services information, and/or other information of interest based on a website map, website topography information, and/or other information. Any information identified by the pattern recognition module may be used to form the taxonomy at block 1104.

Additionally, at block 1104, the server 102 may analyze the information 400 included in each received business listing 120 for accuracy and completeness. For example, at block 1104 the server 102 may identify one or more deficiencies in the information 400 included in the respective business listings 120. Such deficiencies may include, among other things, missing information (e.g., a missing website, a missing telephone number, missing zip code, etc.) and/or inaccurate or outdated information. For example, the business listing module 206 may determine that the information 400D included in the business listing 120D is missing the website of the business entity to which the business listing 120D corresponds. In this example, the business listing module 206 may identify such a deficiency by identifying a blank website data field included in the business listing 120D. Additionally or alternatively, the business listing module 206 may employ one or more text recognition engines, image recognition engines, and/or other hardware or software to assist in identifying such an information deficiency. In still further examples, a human information specialist assisting in the formation of the taxonomy at block 1104 may identify such a deficiency upon manually reviewing the information 400D.

Figure 6:
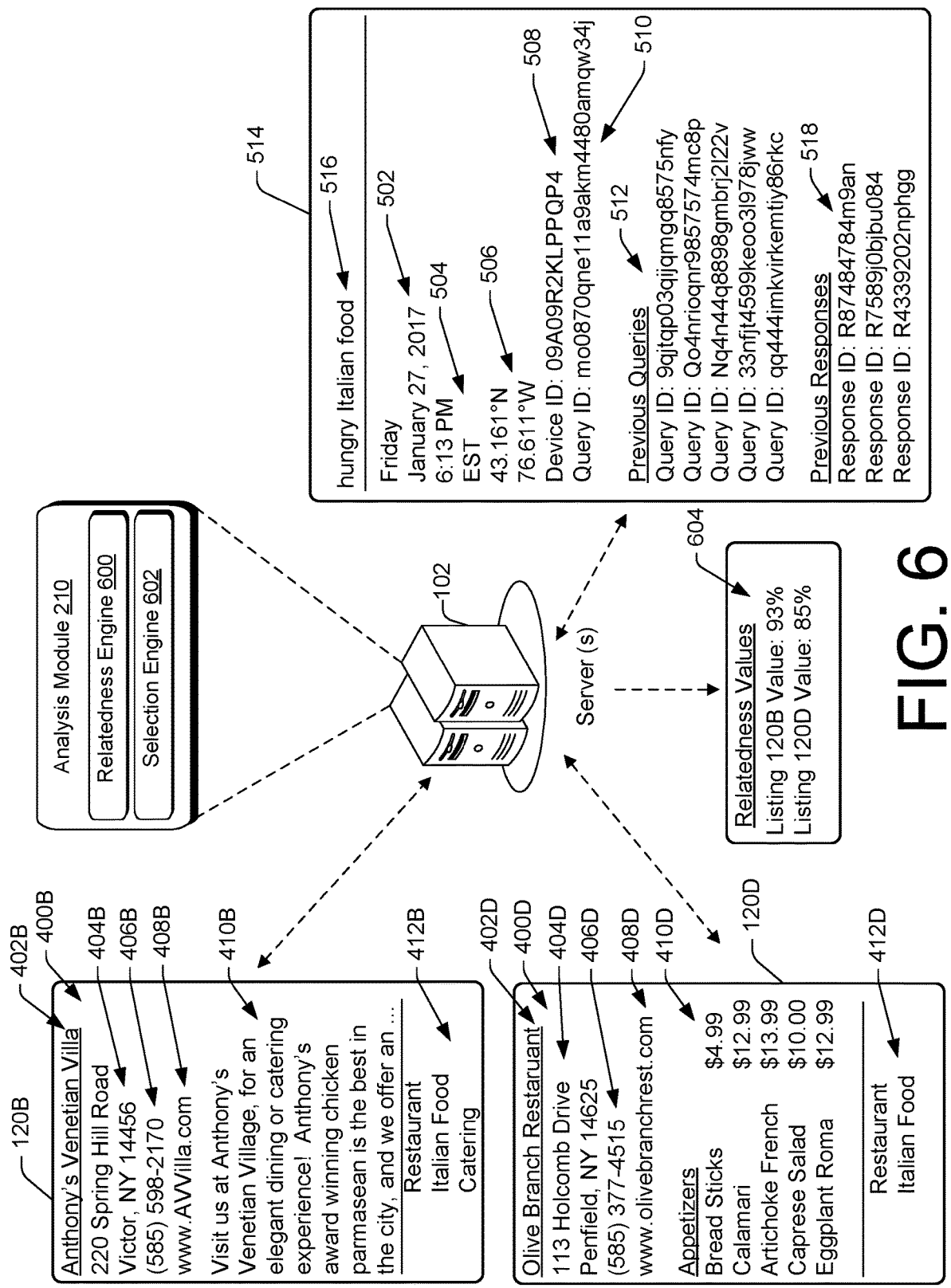
FIG. 6 shows example relatedness values that may be generated based at least in part on one or more corresponding business listings.

At block 1104, and at least partly in response to identifying such a deficiency, the business listing module 206 may generate one or more requests 122 seeking the website of the business entity corresponding to the business listing 120D. At block 1104, the business listing module 206 and/or the output module 214 may also transmit such requests 122 to one or more of the sources 118 in order to correct and/or satisfy the identified deficiency. Upon receiving various responses 124 from the sources 118, the business listing module 206 may augment the information 400D included in the business listing 120D by adding at least a portion of the additional information included in one or more of the received responses 124. For example, as shown in FIG. 6, the information 400D included in the business listing 120D may be augmented by adding the website 408D associated with the particular business entity to which business listing 120D corresponds.

At block 1104, the server 102 may also generate one or more categories and/or other identifiers associated with the information 400 included the various business listings 120 received at block 1102. For example, at block 1104 the business listing module 206 may compare the information 400 included in a business listing 120 with corresponding information 400 included in one or more additional business listings 120. With reference to the business listings 120 illustrated in FIG. 4, in some examples the business listing module 206 may compare the text 410 of a number of business listings 120, and through such a comparison, may determine a similarity in the words, content, or language used to describe the corresponding business entities associated with the compared text 410. For example, the business listing module 206 may compare the text 410A, 410B, 410C, 410D, and may determine that the text 410A, 410B, 410D included in the business listings 120A, 120B, and 120D is descriptive of restaurants corresponding to those business listings 120A, 120B, 120D. As a result, the business listing module 206 may associate a common identifier 412 (e.g., "restaurant") with the respective business listings 120A, 120B, 120D based at least partly on the shared characteristics of the text 410A, 410B, 410D and/or other portions of the information 400A, 400B, 400D.

At block 1104, the business listing module 206 may also link, assign, save, and/or otherwise associate such business listings 120A, 120B, 120D with one or more additional identifiers 412A, 412B, 412D indicating the type of goods or services provided by the business entity corresponding to the respective business listings 120A, 120B, 120D, and the additional identifiers 412A, 412B, 412D may be different from the initial identifier (e.g., "restaurant") noted above. For example, as shown in FIG. 4 the text 410A and/or other information 400A associated with the business listing 120A may be indicative of a restaurant specializing in Chinese food, and as a result, the business listing module 206 may link, assign, and/or otherwise associate such the business listing 120A with an additional identifier 412A (e.g., "Chinese food") different from the "restaurant" identifier 412A noted above. Similarly, the text 410B and/or other information 400B associated with the business listing 120B may be indicative of a restaurant specializing in Italian food, and as a result, the business listing module 206 may link, assign, and/or otherwise associate such the business listing 120B with an additional identifier 412B (e.g., "Italian food") different from the "restaurant" identifier 412B noted above. In any of the examples described herein, the identifiers 412 may comprise metadata that is linked, assigned, saved, and/or otherwise associated with a respective business listing 120 by the business listing module 206 at block 1104. At block 1104, such identifiers 412, business listings 120, and/or the taxonomy generally, may be stored within the data store 216 and/or within other portions of the memory 204.

Figure 5:
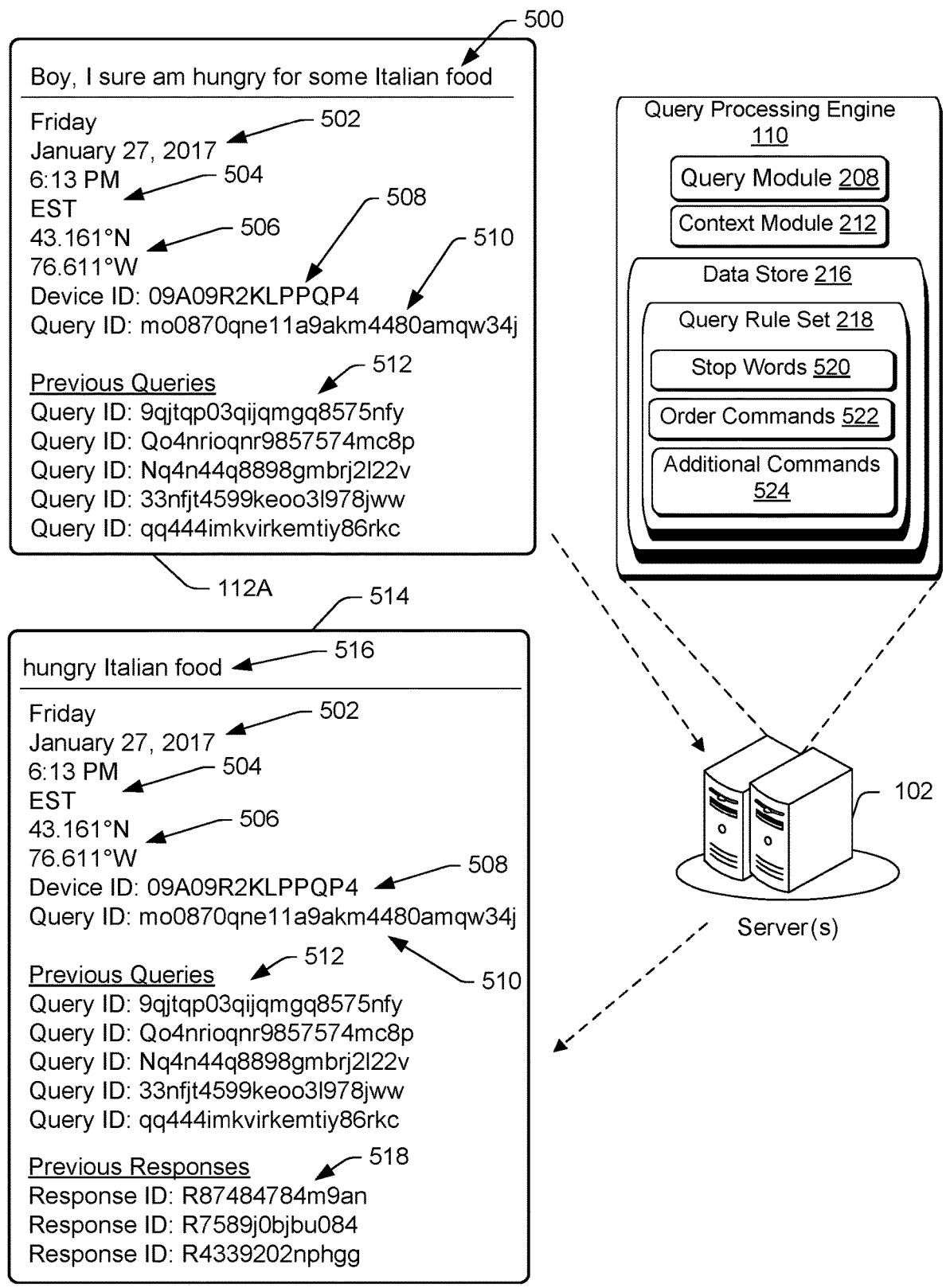
FIG. 5 shows an example first business listing and a corresponding example second business listing that may be generated based at least partly on the first business listing.
Figure 7:
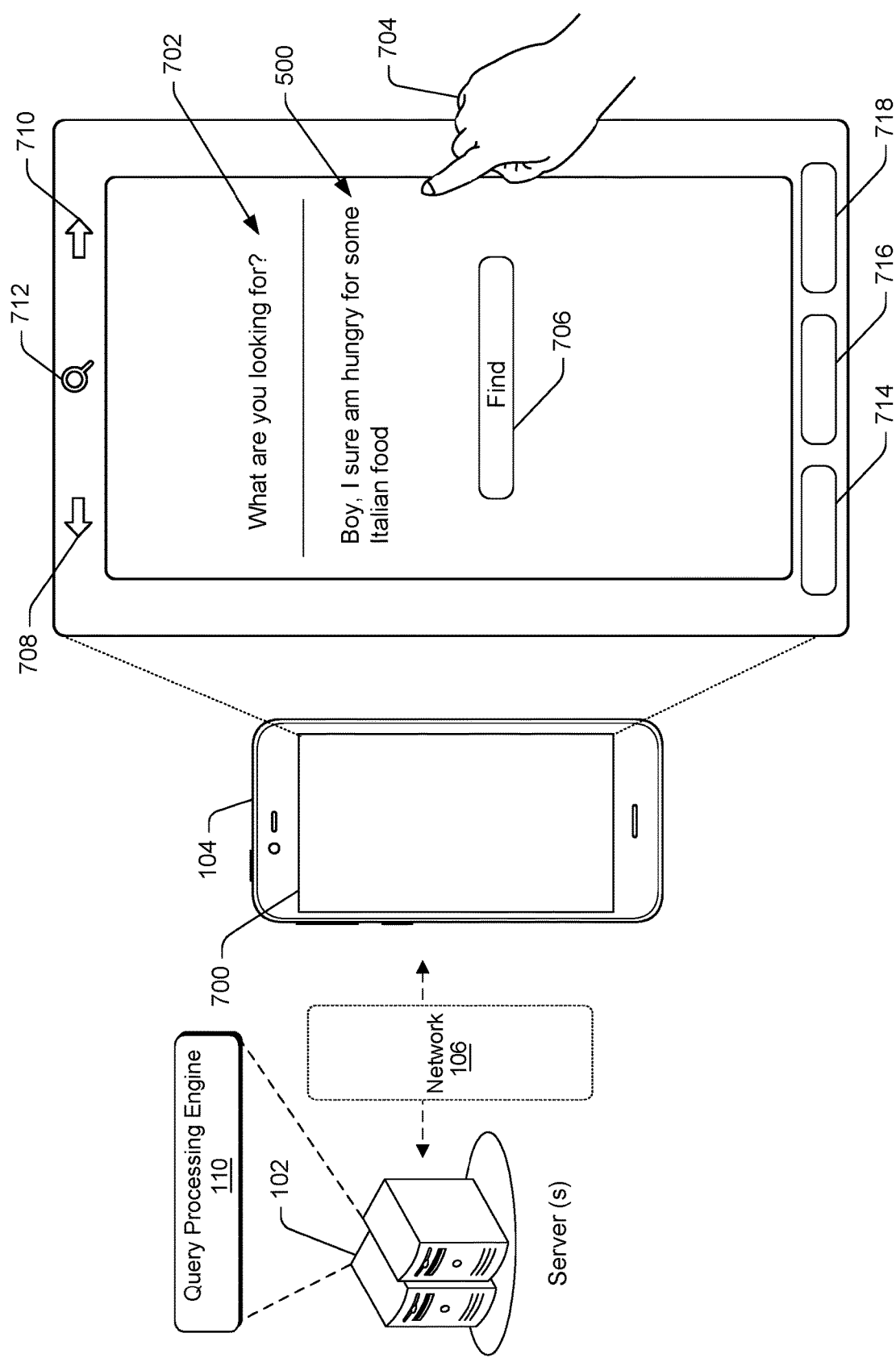
FIG. 7 shows an example user interface screen displayed on an electronic device that enables users to enter queries and/or provide other input.

At block 1106, the server 102 may receive a query 112 from an electronic device 104, and via the network 106. For example, the user 116 may enter such a query 112 using an app that is active on the electronic device 104, and in example embodiments the query 112 may comprise one or more statements, questions, images, videos, audio, and/or other content indicative of information being sought by the user 116. Such an example query 112A is illustrated in FIG. 5, and an example user interface that may be used to generate such an example query 112A is illustrated in FIG. 7. With reference to FIG. 5, in such examples the query 112A may include one or more words 500 (e.g., a sentence, phrase, or question) entered by the user 116 using one or more user interface devices 314 of the electronic device 104. The query 112A may also include one or more pieces of additional information including, for example, any of the contextual information described herein. As shown in FIG. 5, such contextual information may include, among other things, the one or more components of the electronic device 104 used to generate the query 112A (e.g., camera, microphone, keyboard, display, and/or other user interface device 314 of the electronic device 104 etc.), a day, date 502, time of day and/or time zone 504 at/in which the query 112A was generated, a geographic location 506 of the electronic device 104 when the query 112A was generated (e.g., latitude and longitude, city, state, zip code, address, global positioning system coordinates, etc.) an identification code 508 unique to the electronic device 104 used to generate the query 112A, an identification code 510 unique to the respective query 112A, and/or other information 512 (e.g., a list of previous searches/queries performed by the user 116 and/or on the electronic device 104). In example embodiments, such queries 112A may comprise text 500 entered by the user 116 via the electronic device 104, a gesture command entered by the user 116 via the electronic device 104, and/or a voice command entered by the user 116 via the electronic device 104. Such queries 112A may be at least temporarily stored in the data store 216 at block 1106.

With reference to FIG. 7, an example user interface displayed via a display 700 of an electronic device 104 may be configured to enable the user 116 to generate any of the digital requests and/or other like queries 112 described herein. For example, the user interface shown in FIG. 7 may be displayed on an electronic device 104 that enables users to create, capture, search for, and/or select digital queries 112, and to generate and/or consume digital responses 114. The user interface shown in FIG. 7 may be a user interface, screen, and/or other portion of an app that is active on the electronic device 104. In particular, the user interface may be an interface generated and provided by the user interface module 306 and/or the query module 308 as part of a digital query generation application operating locally on the electronic device 104. Additionally or alternatively, the user interface shown in FIG. 7 may be a user interface, screen, and/or other portion of a search engine and/or other website that is being accessed via a web browser of the electronic device 104.

As shown, an example user interface may provide a message 702 to the user 116 requesting information related to the user's intent. In particular, the message 702 may prompt the user 116 to enter one or more queries 112. As shown in FIG. 7, the user 116 may enter text 500 associated with the query 112 by contacting the display 700 with the user's hand 704 (e.g., via a touch input using a displayed keyboard or other like means/control), by performing one or more hand gestures (e.g., via a gesture input), and/or via one or more voice commands (e.g., via an audio input).

Such example user interfaces may also include one or more controls configured to assist the user 116 in generating the query 112 and/or to otherwise assist in performing any of the methods described herein. For example, the user interface may include a control 706 configured to receive an input from the user 116 and, in response, to provide the query 112 to the server 102 via the network 106. The user interface illustrated on the display 700 may also include a navigation control 708 that, upon selection thereof by the user 116, may enable the user 116 to browse backward or forward between different user interfaces while generating a digital query 112. For example, a first navigation control 708 may comprise a "back" control while a second navigation control 710 may comprise a "forward" control. The user interface may further include a zoom control 712 configured to enlarge or reduce, for example, the size of an image or text shown on the display 700. Also, the user interface may include one or more additional controls 716, 716, 718 configured to assist the user 116 in interacting with various results received based on the query 112. As shown in FIG. 9, a first control 716 may be configured to assist the user 116 in locating a particular business entity on a digital map, a second control 716 may assist the user 116 in calling the particular business entity, and a third control 718 may assist the user 116 in visiting the webpage of the particular business entity.

With continued reference to FIG. 11, at block 1108 the server 102 may generate one or more secondary queries 514 (see FIG. 5) based at least in part on the query 112A received at block 1106 and on the query rule set 218 stored within the memory 204. In example embodiments, the secondary query 514 generated at block 1108 may include at least a portion of the contextual information included the query 112A. Additionally or alternatively, the secondary query 514 may include one or more words 516 and/or other portions of the text 500 entered by the user 116 and included in the query 112A. For example, as shown in FIG. 5, a secondary query 514 may include one or more words 516 ("hungry Italian food") originally provided in the text 500 ("Boy, I sure am hungry for some Italian food") of the query 112A. The secondary query 514 may further include additional information 518 not included in the query 112A. Such additional information 518 may include, for example, a list of unique identification codes corresponding to previous responses 114 generated by the server 102 in response to previous related queries 112.

In generating such a secondary query 514 at block 1108, the query module 208 of the server 102 may reference the query rule set, 218 stored within the data store 216. In some examples, the query rule set 218 may include one or more lists of stop words 520 that should be removed and/or otherwise omitted when generating such secondary queries 514. Such stop words 520 may be, for example, words in the English language that provide relatively little information when used in a sentence, and that have a relatively high occurrence rate in natural language conversations/statements. For example, a list of stop words 520 that may be included in the query rule set 218 may include, among other things, "a," "um," "the," "like," "for," "boy," "man," "dude," "sure," and the like. As shown in FIG. 5, the words "Boy, I sure am," and "for some" have been omitted from the words 516 by the query module 208 in generating the secondary query 514. Removing and/or omitting such stop words 520 and/or other content when generating secondary query 514 may result in the secondary query 514 having a relatively smaller file size than the received query 112A. As a result, the generated secondary query 514 may require less memory space for storage than the received query 112A, and may also require less processor and/or network resources for processing the secondary query 514 to generate a corresponding response 114. As a result, efficiency and operation of the various systems described herein may be improved due to the generation of such secondary queries 514.

Additionally, it is understood that the text 500 included in the query 112A may include a plurality of words arranged in a particular order (e.g., a first word "hungry" located before a second word "Italian," and a third word "food" located after the second word). Such a particular word order may be dictated by proper grammar, syntax, and/or other contextual factors associated with using natural language to enter the text 500 of the query 112A. In such examples, the query rule set 218 may also include one or more order commands 522 and/or any other additional grammar, syntax, context, and/or other additional commands 524 configured to assist the query module 208 and/or the context module 212 in parsing the text 500 of the query 112A. For example, the order commands 522 may include at least one command executable by the server 102, when generating the secondary query 514, to maintain two or more words in the particular order in which they appeared in the primary query 112A. For example, at least one of the order commands 522 may control the query module 208 to maintain the particular order (as set forth in the text 500) of the words "hungry," "Italian," and "food" when generating the secondary query 514. As a result, the secondary query 514 may include the words 516 "hungry," "Italian," and "food" in the same order in which those words appear in the text 500.

With continued reference to FIG. 11, at block 1110 the server 102 may compare the secondary query 514 with at least one of the business listings received at block 1102 and/or modified at block 1104. In some examples, the server 102 may compare the secondary query 514 with at least a subset of the business listings 120 stored within the memory 204, and in additional examples, the server 102 may compare the secondary query 514 with each of the business listings 120 stored within the memory 204. In any of the examples described herein, the analysis module 210 and/or other components of the query processing engine 100 may, at block 1110, compare at least the words 516 of the generated secondary query 514 with the text 410 and/or other information 400 of the various business listings 120. Such comparisons may indicate the degree to which the words 516 and/or other components of the secondary query 514 are similar to and/or otherwise related to the various business listings 120 stored within the memory 304.

For example, in some embodiments the analysis module 210 may determine a plurality of relatedness values at block 1110. In such examples, each value of the plurality of relatedness values may be indicative of a level of relatedness between at least part of the secondary query 514, and a respective business listings 120 that is included in the subset of business listings 120 being compared at block 1110. In particular, each relatedness value may comprise a quantifiable metric indicative of how similar (e.g., the degree of similarity) the words 516 and/or other information included in the secondary query 514 is to the text 410 and/or other information 400 included in each of the stored business listings 120. As shown in FIG. 6, in such examples, the analysis module 210 may include a relatedness engine 600 and a selection engine 602. In comparing the secondary query 514 with one or more business listings 120 at block 1110, the relatedness engine 600 may determine a plurality of respective relatedness values 604 using one of several methods.

For example, in generating the one or more relatedness values 604, the relatedness engine 600 may match at least one of the words 516 included in the secondary query 514 with a corresponding word included in the text 410 of one or more of the business listings 120. In such examples, a single word match may indicate that the secondary query 514 is relatively closely related to the one or more business listings 120 including the matched word, and each such business listing 120 may be given a corresponding first score and/or weight. Multiple word matches may, on the other hand, indicate that the secondary query 514 is relatively more closely related to the one or more business listings 120 including the multiple matched words. Each such business listing 120 having multiple word matches may be given a corresponding second score and/or weight that is greater than the first score and/or weight. In this way, the relatedness engine 600 may provide each of the business listings 120 with a respective score and/or weight. Such scores and/or weights may be normalized and/or otherwise manipulated to produce the relatedness values (e.g., percentages) 604 shown in FIG. 6. According to the relatedness values 604 shown in FIG. 6, the business listing 120B (having a relatively higher relatedness value) may be more closely related to the secondary query 514 than the business listing 102D (having a relatively lower relatedness value). Although not illustrated in FIG. 6, it is understood that at block 1110 the relatedness engine 600 may generate additional relatedness values 600 for each of the remaining business listings 120 stored within the memory 204.

Further, the analysis module 210 may be configured to select at least a subset of the business listings 120 being compared at block 1110 based at least in part on the comparison described above. The analysis module 210 may also be configured to select one or more of the identifiers described herein at block 210. For example, at block 1112 the selection engine 602 of the analysis module 210 may select a group of the business listings 120 having relatively high relatedness values 604 such that the selected group of businesses listings 120 may be provided to the user 116 of the electronic device 104. For example, at block 1112 the selection engine 602 may select at least a first business listing (e.g., business listing 102B) having a highest value of the plurality of relatedness values 604 generated at block 1110, and may also select at least a second business listing (e.g., business listing 102D) having a sequentially/quantitatively second highest value of the plurality of relatedness values 604. In further examples, it is understood that the selection engine 602 may select greater than or less than two business listings at block 1112 if desired.

Further, as noted above one or more of the queries 112 received at block 1106 may include a variety of contextual information and, in some examples, such contextual information may be useful in determining which business listings 120 to provide to a user 116 in response to such queries 112. For example, the additional commands 524 described above with respect to FIG. 5 may include one or more override commands and/or other such override conditions that can be used by the context module 212 and/or the selection engine 602 of the analysis module 210 to remove and/or otherwise omit one or more of the business listings 120 from the subset of business listings 120 selected at block 1112. For example, at block 1114 the selection engine 602 may reference one or more of the override conditions included in the additional commands 524. In an example embodiment such override conditions may include a temporal limitation, a geographic limitation, a negation language limitation, and/or any other like override condition.

An example temporal limitation may require the selection engine 602 to omit a particular business listing 120 from the subset of business listings selected at block 1112 if context information included in the query 112A and/or in the corresponding secondary query 514 (e.g., the time of day and/or time zone 504 at/in which the query 112A was generated) does not coincide with and/or are contrary to the business hours and/or hours of operation of the business entity associated with the particular business listing 120. An example temporal limitation may also require the selection engine 602 to omit a particular business listing 120 from the subset of business listings selected at block 1112 if the text 500 included in the query 112A and/or the words 516 included in the corresponding secondary query 514 (e.g., "want breakfast") do not coincide with and/or are contrary to the services provided by the business entity associated with the particular business listing 120 (e.g., a restaurant that only serves lunch and dinner). Additionally, an example geographic limitation may require the selection engine 602 to omit a particular business listing 120 from the subset of business listings selected at block 1112 if context information included in the query 112A and/or in the corresponding secondary query 514 (e.g., the geographic location 506 of the electronic device 104 when the query 112A was generated) is not within a predetermined distance (e.g., ten miles) of the business entity associated with the particular business listing 120, or is not drivable, walkable, and/or otherwise reachable within a predetermined period of time (e.g., ten minutes). Further, an example negation limitation may require the selection engine 602 to omit a particular business listing 120 from the subset of business listings selected at block 1112 if the text 500 included in the query 112A and/or the words 516 included in the corresponding secondary query 514 (e.g., "do not want Italian food") do not coincide with the goods or services provided by the business entity associated with the particular business listing 120 (e.g., a restaurant specializing in Italian food). Accordingly, at block 1114 the selection engine 602 may reconcile such contextual information with the override conditions included in the additional commands 524.

Figure 8:
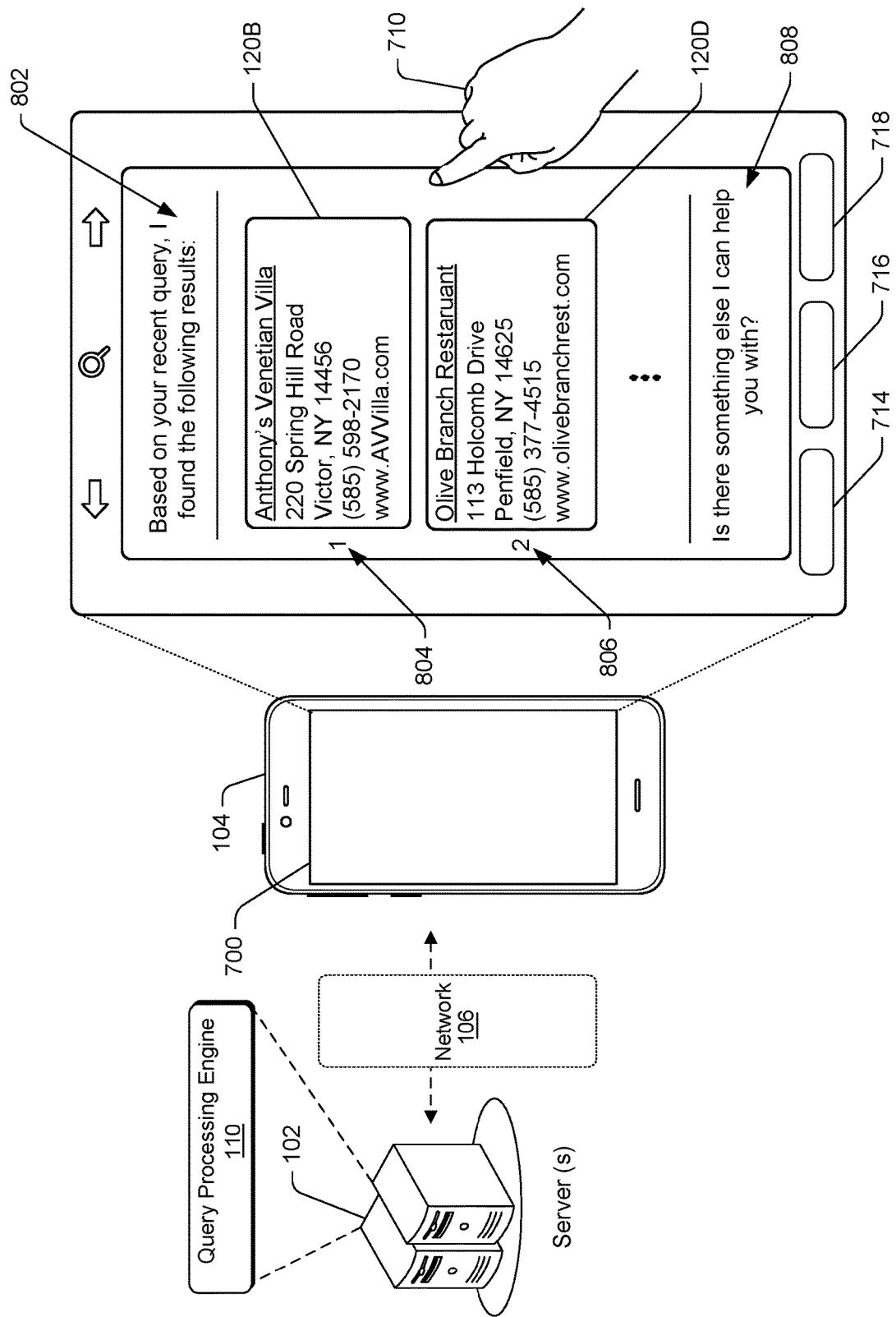
FIG. 8 shows another example user interface screen displayed on an electronic device that enables users to review search results related to a query and/or to provide further input.

With reference to FIG. 11*a*, at block 1116 the server 102 may provide the subset of business listings 120 selected at block 1112, without any of the business listing 120 that were omitted at block 1114. In particular, at block 1116 the output module 214 of the server 102 may provide the business listings 120 to the electronic device 104 via the network 106. In such examples, the output module 214 may provide the business listings 120 with metadata and/or other information indicative of a ranked order in which the business listings should be displayed on the electronic device 104. For example, the output module 214 may provide business listings 120 such that they are configured to be displayed in a ranked order that is based at least in part on the respective levels of relatedness between the secondary query 514, and each of the listings 120 being provided at block 1116. For example, as shown in FIG. 8 an example user interface may include one or more messages 802 indicating that the results of the user's query 112 are being displayed. The user interface may also include one or more indicators 804, 806 indicating the ranked order of the various business listings 120B, 120D being displayed. Further, the user interface may include one or more additional messages 808 offering additional assistance to the user 116. Additionally, in any of the examples described herein, it is understood that at block 1116, the output module 214 of the server 102 may provide one or more respective identifiers 412 to/via the electronic device 104 as well as one or more business listings 120 corresponding to such identifiers. For example, at block 1114, the selection engine 602 may select multiple different categories or identifiers 412 based on respective relatedness values determined between the identifiers 412 (and/or the business listings 120 corresponding to the identifiers 412) and the second query 514. At block 116, the output module 214 may provide multiple identifiers 412 to the electronic device 104 as well as multiple business listings 120 associated with each of the provided identifiers 412. In such examples, multiple identifiers 412 and their corresponding business listings 120 may be viewed by a user of the electronic device 104.

At block 1118, the server 102 may receive one or more additional inputs from the user 116 via the electronic device 104. For example, at block 1118 the user 116 may select (e.g., by providing a touch input on the display 700) one of the business listings 120 and/or one of the identifiers 412 being displayed on the display 700. The output module 310 may then generate one or more signals indicative of the user's selection, and may transmit such signals to the server 102 via the network 106. At block 1118, the server 102 may receive, via the network 106, the signal from the electronic device 104 indicating that the user 116 has selected a particular one of the business listings 120 (and/or one of the identifiers 412) provided at block 1116. At least partly in response to receiving such an indication, the server 102 may store and/or otherwise record, at block, 1120, information indicative of the user's selection within the memory 204.

For example, at block 1120 the server 102 may store information indicative of the initial query 112A entered by the user 116, the subset of business listings 120 selected at block 1112, subset of business listings 120 provided at block 1116, and/or an indication of the particular business listing 120D selected by the user at block 1118. Such information may be utilized, for example, to inform further responses 114 generated by the server 102. For example, in further query processing methods, the server 102 may make a determination as to which business listings 120 to provide at block 1116 based at least in part on the information recorded at block 1120. In further examples, such information may also be utilized to improve the accuracy of the responses 114 provided by the server 102. For example, at least partly in response to receiving an indication of the particular business listing 120D selected by the user 116 at block 1118, the business listing module 206, and/or other components of the query processing engine 110 may add one or more of the words 516 and/or other information included in the secondary query 514 to the particular business listing 120D selected by the user 116. By modifying the business listing 120D to include such words 516, the server 102 may increase the probability that the particular business listing 120D may be selected and/or provided by the server 102 in response to future similar and/or otherwise related queries 112.

Further, as illustrated in FIG. 9 in response to receiving a selection of the particular business listing 120D, the electronic device 104 may illustrate an expanded view of the information 400D associated with the business listing 120D. Additionally or alternatively, the electronic device 104 may provide one or more additional controls 902 enabling the user to request still additional information associated with the displayed business listing 120D. Such additional controls may also include a control 904 operable to enable the user 116 to add the business entity associated with the displayed business listing 120D to the user's contacts listing or other databases. As shown in FIG. 10, the electronic device 104 may also display, for example, the one or more identifiers 412D associated with the business listing 120D in response to receiving an input via the control 902.

In summary, example embodiments of the present disclosure provide a new and novel approach to providing query results. In particular, the techniques described herein involve generating a unique taxonomy based on received business listings and information contained therein. The techniques also involve generating a secondary query based on query received from a user. The secondary query may be generated by omitting components of the original query. Thus, the secondary query comprises a relatively smaller electronic file that can be stored using less storage space, and that can be analyzed and/or transmitted using relatively fewer processor and/or network resources. In particular, such a reduced file size may reduce the server and/or electronic device memory required to receive and/or store such queries. Such a reduced file size may also reduce the server and/or electronic device processor load required to provide, render, display, and/or otherwise process related digital responses 114. Such a reduction in file size and/or memory requirements will reduce overall network load/traffic, and will improve network, server, and/or electronic device performance and efficiency. Further, the secondary query is used by the processor to interrogate the taxonomy and to identify more accurate intent-based results than ordinary search engines. As a result, user satisfaction is improved.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A method, comprising:
  receiving, with a server, a plurality of business listings, each listing of the plurality of business listings including information identifying a respective business entity;
  associating, within a memory associated with the server, an identifier with each listing of the plurality of business listings, each respective identifier being indicative of information included in listings of the plurality of business listings associated with the respective identifier, wherein the associating comprises comparing, with the server, the information included in each listing of the plurality of business listings with other information included in one or more other business listings;
  receiving, with the server and via a network, a first query, the first query including a word;
  generating, with the server, a second query based at least in part on the first query and on a query rule set stored within the memory, the second query including at least one word included in the first query;
  comparing the second query with at least a first subset of business listings included in the plurality of business listings;
  receiving, with the server and via the network, metadata comprising contextual information associated with the first query, wherein the metadata is received without user input;
  selecting, based at least in part on the comparing and the contextual information, a second subset of business listings included in the at least the first subset of business listings; and
  providing the second subset of business listings configured to be displayed in a ranked order, wherein the ranked order is based at least in part on respective levels of relatedness between the second query and each listing included in the second subset of business listings.

2. The method of claim 1, wherein information included in each listing of the plurality of business listings comprises text describing at least one of goods and services provided by a particular business entity identified by the information included in the listing, the method further comprising:
  identifying, with the server, a deficiency in the information included in the listing; and
  augmenting, with the server and in response to the identifying, the information included in the listing with additional information retrieved via an automated search.

3. The method of claim 1, wherein associating the identifier with each listing of the plurality of business listings comprises associating a first identifier with a first listing of the plurality of business listings, the method further comprising:
  associating, within the memory, a second listing of the plurality of business listings with the first identifier; and
  associating, within the memory, a second identifier different from the first identifier with a third listing of the plurality of business listings, wherein
    the second identifier is indicative of information included in the third listing, and
    the first and second identifiers are generated by the server.

4. The method of claim 1, wherein the first query comprises one of text entered by a user via an electronic device remote from the server, and a voice command entered by the user via the electronic device.

5. The method of claim 1, wherein
  the query rule set comprises a list of stop words, and
  generating the second query comprises removing a stop word included in the list of stop words from the first query.

6. The method of claim 1, wherein
  the first query comprises a first word and a second word,
  the first word and the second word are arranged in a first order in the first query such that the first word precedes the second word, and
  the query rule set comprises a command executable by the server to maintain the first word and the second word in the first order in the second query.

7. The method of claim 1, wherein
  comparing the second query includes determining a plurality of relatedness values, each value of the plurality of relatedness values being indicative of a level of relatedness between the second query and a respective listing included in the second subset of business listings, and
  the second subset of business listings is selected based at least in part on the plurality of relatedness values.

8. The method of claim 7, wherein selecting the second subset of business listings includes selecting a first business listing having a highest value of the plurality of relatedness values, and selecting a second business listing having a sequentially second highest value of the plurality of relatedness values.

9. The method of claim 1, wherein the comparing the second query includes matching at least one word included in the second query with a corresponding word of a particular business listing included in the first subset of business listings, and determining a relatedness value corresponding to the particular business listing based at least partly on matching the at least one word.

10. The method of claim 1, further including omitting a business listing from the second subset of business listings based at least in part on the contextual information.

11. The method of claim 1, further including receiving, with the server and via the network, an indication of a selection of one of the business listings included in the second subset of business listings, and storing, in the memory and at least partly in response to receiving the indication, information indicative of:
the first query,
the second subset of business listings, and
the selection.

12. The method of claim 11, further including adding text included in the second query to the one of the business listings at least partly in response to receiving the indication.

13. The method of claim 1, further comprising:

identifying a pattern associated with pages of a website;

identifying the pages of the website as including product information or service information based at least in part on the pattern; and forming at least one business listing using the product information or the service information.

14. The method of claim 13, wherein the pattern is based on at least one of page density, page weight, or page format.

15. The method of claim 1, further comprising:

identifying a pattern associated with text included in a page of a website, the pattern indicating contact information associated with a first business entity corresponding to the website; and adding the contact information to a first listing of the plurality of business listings associated with the first business entity.

16. A system, comprising:

a server; and memory associated with the server, the memory storing a plurality of business listings and instructions which, when executed by the server, cause the server to perform operations including:

associating, within the memory, an identifier with the plurality of business listings, the identifier being indicative of information included in the plurality of business listings, wherein the associating comprises comparing information included in each listing of the plurality of business listings with other information included in one or more other business listings;

receiving, via a network, a first query, the first query including a word;

generating a second query based at least in part on the first query and on a query rule set stored within the memory, the second query including at least one word included in the first query;

receiving, with the server and via the network, metadata comprising contextual information associated with the first query, wherein the metadata is received without user input;

selecting a subset of business listings included in the plurality of business listings, wherein the subset of business listings is selected based at least in part on the second query and the contextual information; and providing the subset of business listings via the network such that the subset of business listings is configured to be displayed in a ranked order, wherein the ranked order is based at least in part on respective levels of relatedness between the second query and each listing included in the subset of business listings.

17. The system of claim 16, wherein the operations further include identifying, with the server, a deficiency in the information included in the listing; and augmenting, with the server and in response to the identifying, the information included in the listing with additional information retrieved via an automated search.

18. The system of claim 16, wherein the operations further include determining a plurality of relatedness values, each value of the plurality of relatedness values being indicative of a level of relatedness between the second query and a respective listing included in the subset of business listings, and wherein selecting the subset of business listings includes selecting a first business listing having a highest value of the plurality of relatedness values, and selecting a second business listing having a sequentially second highest value of the plurality of relatedness values.

19. The system of claim 16, wherein the operations further include receiving, via the network, an indication of a selection of one of the business listings included in the subset of business listings;

receiving, via the network, a request for information related to the one of the business listings; and providing, via the network, the identifier at least partly in response to the request.

20. The system of claim 16, wherein the operations further include receiving, via the network, an indication of a selection of one of the business listings included in the subset of business listings;

storing, in the memory and at least partly in response to receiving the indication, information indicative of:
the first query,
the subset of business listings, and
the selection; and modifying the one of the business listings at least partly in response to receiving the indication.

21. A system, comprising:

a server in communication with a network; and memory associated with the server, the memory storing a plurality of business listings and instructions which, when executed by the server, cause the server to perform operations including:

associating, within the memory, at least one identifier with each listing of the plurality of business listings, wherein the associating comprises comparing information included in each listing with other information included in one or more other listings;

receiving, via the network and from an electronic device remote from the server, a first query associated with the plurality of business listings;

receiving, via the network and from the electronic device, metadata comprising contextual information associated with at least one of the electronic device and the first query, wherein the metadata is received without user input;

generating a second query based at least in part on the first query and on a query rule set stored within the memory, the second query including at least one word included in the first query;

selecting a subset of business listings included in the plurality of business listings, wherein the subset of business listings is selected based at least in part on the second query and the contextual information; and providing the subset of business listings via the network such that the subset of business listings is configured to be displayed on the electronic device in a ranked order, wherein the ranked order is based at least in part on respective levels of relatedness between the second query and each listing included in the subset of business listings.

22. The system of claim 21, wherein the contextual information includes at least one of a geographic location of the electronic device, a time of day at which the first query was received at the electronic device, an indication of time included in the first query, and an indication of an event included in the first query.

23. The system of claim 22, wherein the operations further include omitting a business listing from the subset of business listings based at least in part on the contextual information.

* * * * *